United States Patent [19]

Cheradame et al.

[11] Patent Number: 5,336,745
[45] Date of Patent: Aug. 9, 1994

[54] TERMINALLY-SUBSTITUTED POLYMERIC COMPOSITIONS FROM CATIONICALLY POLYMERIZABLE MONOMERS AND INITIATORS

[75] Inventors: Herve M. Cheradame, Latronche, France; Robert D. Lundberg, Bridgewater; Frank J. Chen, Edison, both of N.J.; Jean de la Crois Habimana, Grenoble, France

[73] Assignee: Exxon Chemical Patents Inc., Linden, N.J.

[21] Appl. No.: 700,980

[22] Filed: May 16, 1991

Related U.S. Application Data

[62] Division of Ser. No. 212,689, Jun. 28, 1988, Pat. No. 5,032,653.

[51] Int. Cl.$^5$ ............................................. C08F 110/04
[52] U.S. Cl. ........................... 526/347.1; 526/147; 526/217; 526/219.2; 526/220; 526/237; 526/238; 526/280; 526/281; 526/282; 526/308; 526/346; 526/348.6; 526/348.7; 526/351; 525/351; 525/374; 525/377; 528/408
[58] Field of Search ............... 526/348.7, 348.6, 351, 526/346, 347.1, 280, 281, 282, 308, 147, 217, 219.2, 220, 237, 238; 525/334.1, 374, 376, 377, 333.7, 254, 259; 528/408

[56] References Cited

U.S. PATENT DOCUMENTS

| | | | |
|---|---|---|---|
| 3,324,089 | 6/1967 | Trepka | 525/377 X |
| 3,645,917 | 2/1972 | Vandenberg et al. | 260/2 A |
| 3,684,713 | 8/1972 | Piccollino | 252/47.5 |
| 3,872,069 | 3/1975 | Priola et al. | 526/189 X |
| 3,993,609 | 11/1976 | Kamens et al. | 260/2.5 R |
| 4,029,615 | 6/1977 | Kamens et al. | 260/2.5 R |
| 4,100,086 | 7/1978 | Larkin et al. | 525/334.1 X |
| 4,113,804 | 9/1978 | Cotton et al. | 260/897 A |
| 4,268,450 | 5/1981 | Frankel et al. | 260/349 |
| 4,278,822 | 7/1981 | Ver Strate et al. | 570/257 |
| 4,393,199 | 7/1983 | Manser | 528/408 |
| 4,405,762 | 9/1983 | Earl et al. | 525/410 |
| 4,483,978 | 11/1984 | Manser | 528/408 |
| 4,556,732 | 2/1986 | Kennedy et al. | 526/206 |
| 4,568,732 | 2/1986 | Kennedy et al. | 526/206 |
| 4,611,037 | 9/1986 | Musch et al. | 526/135 |

FOREIGN PATENT DOCUMENTS

0206756 12/1986 European Pat. Off. .
0265053 4/1988 European Pat. Off. .

OTHER PUBLICATIONS

Hackh's Chem. Dictionary (4th ed.) McGraw-Hill Co., Inc., N.Y., 667 (1969).
Ivan et al., Polymers and Copolymers by Infers. VII, J. Polym. Sci. Polym. Chem. Ed 18 (11), 3177 (1980).
J. P. Kennedy, Carbocationic Polymerization, pp. 419–422, 1982.

*Primary Examiner*—Fred Teskin
*Attorney, Agent, or Firm*—J. B. Murray, Jr.; J. F. Hunt; K. R. Walton

[57] ABSTRACT

A method is provided for the direct synthesis of novel polymeric materials functionalized with desirable nitrogen-containing functional groups such as terminal azido, cyano, carbonylamino or thiocarbonylamino groups. Polymerization and functionalization occur in a substantially simultaneous manner. All necessary reactants for the functionalization are present when polymerization is initiated. The nitrogen-containing functional group is provided as a part of a molecule having a release moiety which is preferably resonance stabilized or of tertiary alkyl type and which acts to aid the nitrogen-containing species in functioning as a leaving group.

17 Claims, No Drawings

TERMINALLY-SUBSTITUTED POLYMERIC COMPOSITIONS FROM CATIONICALLY POLYMERIZABLE MONOMERS AND INITIATORS

This is a divisional application under 37 CFR 1.60, of pending prior application Ser. No. 212,689 filed on Jun. 28, 1988, now U.S. Pat. No. 5,032,653.

BACKGROUND OF THE INVENTION

Field of the Invention

This invention relates to a method for direct synthesis of nitrogen-containing polymers, and particularly to the production of nitrogen-containing polymeric materials in a single step Friedel-Crafts polymerization of olefinic materials containing substantial amounts of isobutylene. Nitrogen-containing functional groups such as the azide, cyano, carbonylamino or thiocarbonylamino groups are advantageous since it is a polar group which imparts good properties to a polyolefinic substrate. Also, these groups may act as a reactive site for further modification of the polymer. Nitrogen-containing polyisobutylenes have applications such as lube additives, compatibilizers, emulsifiers, and the like. For example, azide terminal polymers may be further modified by, for instance, phthalamidation or reduction of the azide group and thus result in polymer products with useful modifications. For instance, reduction of the azide group of polyisobutylenes and addition of a polar moiety to the alpha nitrogen atom may result in improved polymeric compatibilizers, emulsifiers, etc.

Prior art processes for synthesis of polymers having nitrogen-containing functional groups, such as nitrogen-containing polyisobutylene, involved several reaction steps. Chain end functionalization is known in the field of cationic polymerization. Chain end functionalization may result from transfer reactions such as those described in U.S. Pat. 4,568,732 which relates to a continuous process for forming telechelic halogenated polymers wherein a cationically polymerizable monomer and an inifer (initiator-transfer agent) are contacted with a boron chloride solvent solution. Disclosed monomers are olefins of from 4 to 12 carbon atoms, e.g., isobutylene. Suitable inifers are halogenated aromatic or aliphatic hydrocarbons, vinyl halides, silane-substituted hydrocarbyl halides, dicyclopentadienyl halides, alpha-chlorostyrene homopolymers, and 2-chloro-propene homopolymers and copolymers, wherein the halide is F, Cl or Br. U.S. Pat. No. 4,611,037 relates to a process for preparing polymers having reactive halogen and groups employing cationically polymerizable monomers and a catalyst system consisting of a metal halide and an organic halide, wherein the metal halide is used in from 2 to 500 times molar excess, based on the organic halide.

Chain end functionalization may also be accomplished by termination reactions wherein a functional group is imparted to the electrophilic site of a developing polymer. Such systems entail high manufacturing costs and expend considerable process control resources due to the number of reaction steps involved.

U.S. Pat. No. 3,684,713 relates to lubricating oil and fuel compositions containing oil-soluble azo compounds prepared by reacting an oil-soluble, synthetic organic polymer having at least 20 carbon atoms with an azo compound (e.g., azo esters, azo amides such as azodiformates and azodiformamides) at temperatures of from 20° to 200° C. Oil-soluble polymers are disclosed to include polybutenes, and copolymers of isobutylene/styrene and isobutylene/1-decene.

U.S. Pat. No. 4,393,199 discloses a cationic polymerization method to produce low molecular weight polymers wherein cyclic ethers (e.g., bis(azidomethyl)oxetane-3) are polymerized in the presence of a diol/cationic catalyst for molecular weight control.

U.S. Pat. No. 4,483,978 relates to energetic copolymers by copolymerization of azido monomers (e.g., bis(azidomethyl)oxetane), wherein the $N_3$ azido group is bonded directly to a ring carbon atom, with a cyclic oxide.

U.S. Pat. Nos. 3,993,609 and 4,029,615 relate to polymeric cellular structures obtained by mixing an acid sensitive azo compound with an acidulous or acidic polymerizable medium, such as unsaturated polyesters and polymeric active resins containing one or more terminal and/or pendant functional groups that undergo free radical reaction.

U.S. Pat. Nos. 3,645,917; 4,268,450; and 4,405,762 relate to polymers having pendant alkylazide side-groups prepared by reaction of a polymer with a metal azide. In U.S. Pat. No. 3,645,917, a polyether polymer is prepared from epichlorohydrin, and then reacted with a metal azide (e.g., sodium azide) at 30° C. to 150° C. to form azidomethyl groups pendant from the main polyether polymer backbone. Polyether and polyester polymers are disclosed in U.S. Pat. No. 4,268,450 to be reacted with sodium azide at 100° C. to form energetic hydroxy-terminated azido polymers having pendant alkyl azide groups. In U.S. Pat. No. 4,405,762, 3,3-bis-chloromethyloxyetane is polymerized to yield halomethyl polymer products having hydroxy functionality which are then reacted with metal azide to form poly(azido methyl oxetanes), which are disclosed to be useful as energenic binders for (e.g.) explosives.

U.S. Pat. No. 4,113,804 discloses compositions comprising polybutene EPDM and polyolefin which are cross-linked by use of chemical free-radical generators or cross-linking agents which are disclosed to include azido formates (e.g., tetramethylenebis(azido formate)), aromatic polyamides (e.g., 4,4'-diphenylmethane diazide) and sulfonazides (e.g., p,p'-oxybis-(benzene sulfonyl azide).

European Patent Application 206,756 relates to olefin polymers such as polyisobutylene, polystyrene, polyoctene and polypropylene which are polymerized in the presence of a preformed catalyst complex of an organic acid or its ester and a Lewis acid, preferably boron trichloride. It is disclosed that the polymerization is believed to occur, e.g. in use of a catalyst complex of an ester and boron trichloride, by the opening of the ester bond and monomer insertion. The organic acids are disclosed to be mono-, di- and tri-carboxylic acids and acids containing chloride, formate, allylic, acrylic or methacrylic.

SUMMARY OF THE INVENTION

It is accordingly an object of the instant invention to provide a direct synthesis of nitrogen-containing polymeric materials by a process wherein all reactants and catalysts are present at the initiation of polymerization.

It is a further object of the invention to provide a process for preparing nitrogen-containing polymeric materials in a more efficient and cost-effective manner.

It is a further object of the invention to provide improved direct synthetic techniques for the production of nitrogen-containing polyisobutylenes.

It is still a further object of the invention to provide novel polymers which are terminally substituted by nitrogen-containing functional groups.

These and other objects will become apparent from a thorough reading of the present application. Applicants achieve these objects by providing a method for direct synthesis of nitrogen-containing polymeric materials which comprises providing a cationically polymerizable monomer, and initiating polymerization in the presence of a suitable cationic polymerization catalyst and a nitrogen-containing initiator compound which includes a nitrogen-containing functional group chemically bound to a release moiety. As the polymerization reaction proceeds, the nitrogen-containing functional group may be released from the nitrogen-containing initiator compound to bind the electrophilic site of the developing polymer and become a covalently bound nitrogen-containing functional group of the polymer. When the nitrogen-containing functional group separates from the nitrogen-containing initiator compound, it leaves behind a release moiety which is preferably a resonance stabilized structure capable of delocalizing charge, thus aiding the departure of the nitrogen-containing functional group. This activity may be further aided if, as in other preferred embodiments, the nitrogen-containing functional group is bound to a secondary or tertiary carbon atom of the release moiety.

In certain preferred embodiments of the invention, polymerization is catalyzed by a Friedel-Crafts catalyst which is contacted under polymerization conditions with a mixture of the nitrogen-containing initiator with a suitable polymerizable monomer. The nitrogen-containing initiator and monomer are preferably admixed in the substantial absence of the Friedel-Crafts catalyst.

DETAILED DESCRIPTION OF CERTAIN PREFERRED EMBODIMENTS

Nitrogen-Containing Initiator

The nitrogen-containing compound employed as initiator in this invention can comprise at least one member selected from the group consisting of (i) compounds of the formula:

        R (Y)$_n$       (Ia)

wherein R is hydrogen or a hydrocarbyl group, n is an integer of from 1 to 10, preferably 1 or 2 and Y is —N$_3$, —CN, —NCO, —OC≡N; —SC≡N; or —NCS; and (ii) compounds of the formula:

        R* (Y)$_n$       (Ib)

wherein n and Y are as defined above, and R* comprises a hydrocarbyl-substituted silyl group of the formula

$$\begin{array}{c} R \\ | \\ R-Si- \\ | \\ R \end{array} \quad (Ic)$$

wherein each R is the same or different and is hydrocarbyl.

Exemplary of R groups are alkyl of from 3 to 100 carbon atoms, preferably 4 to 20 carbon atoms, aryl of from 6 to 20 carbon atoms, preferably from 6 to 15 carbon atoms, alkaryl and aralkyl of from 7 to 100 carbon atoms (e.g., 7 to 20 carbon atoms), preferably from 7 to 100 carbon atoms (e.g., 7 to 20 carbon atoms), and cycloalphatic of from 3 to 20 carbon atoms, preferably from 3 to 12 carbon atoms. When n is 1, R in Formula (Ia) will generally comprise an alkyl group of from 3 to 12 carbon atoms, preferably from 3 to 20 carbon atoms, such as methyl, ethyl, propyl, butyl, pentyl, octyl, decyl, dodecyl, and the like.

Most preferably R in Formula (Ia) comprises a moiety of the formula

$$\begin{array}{c} R^1 \\ | \\ R^2-C- \\ | \\ R^3 \end{array} \quad (IIa)$$

wherein R$^1$, R$^2$ and R$^3$ are the same or different and are H or hydrocarbyl (e.g., alkyl, aryl, alkaryl, aralkyl, heterocyclic or cycloalkyl) with the proviso that at least two of R$^1$, R$^2$, and R$^3$ are hydrocarbyl. Most preferably all of R$^1$, R$^2$ and R$^3$ are hydrocarbyl Exemplary of such secondary and tertiary alkyl groups are isopropyl, tert-butyl, 1-methylpropyl, 1-ethylbutyl, 1,2-dimethylbutyl, and the like. Exemplary of such alkaryl R groups are φCH$_2$—, CH$_3$φCH$_2$—, φC$_2$H$_5$— and the like. Exemplary of such alkaryl groups are CH$_3$φ, (CH$_3$)$_2$φ—, C$_2$H$_5$φ— and the like.

It will be understood that the hydrocarbyl-substituted nitrogen-containing initiators of Formula (Ia) can comprise a polymer, for example, a polyalkene, such as a C$_2$ to C$_{10}$ monoolefin homopolymer or polymer ( e.g., polyisobutylene, ethylene-propylene copolymer, ethylene-propylene-conjugated diene terpolymer), polydiene, such as hydrogenated or nonhydrogenated polyisoprene, polybutadiene and isoprene-butadiene, and aromatic-containing polymers (e.g., styrene-isoprene, styrene-butadiene, methyl-styrene-isoprene-butadiene polymers) onto which one or more Y-functional groups have been grafted.

The carbonylamino (—NCO) and thiocarbonylamino (—NCS) substituted compounds are therefore isocyanates and isothiocyanates, respectively.

Illustrative of hydrocarbyl compounds of Formula I(a) mono-substituted with azido (—N$_3$), cyano (—CN), carbonylamino (—NCO), thiocarbonylamino (—NCS), cyanato (—OCN) , thiocyanato (—SCN) and isothiocyanato (—NCS) groups are hydrazoic acid, HCN, HCNO, HCNS, ethylazide, tert-butylazide, isobutylazide, propylazide, isopropylazide, 2-ethylhexylazide, hexylazide, 1,1-diethylheptylazide, benzylazide, phenylazide, tolylazide, xylylazide, cumylazide, cyclohexylazide, carbonylaminoethane, carbonylaminopropane, 1-carbonylamino-1,1,1-trimethylmethane, 2-carbonylamino-butane, 2-carbonylamino-propane, 3-carbonylamino-2-methyl-heptane, 3-carbonylamino-3-ethyl-nonane, 1-carbonylamino-1-phenyl-methane, 1-carbonylamino-1-tolyl-methane, 1-carbonylamino-1,1-dimethyl-1-phenylmethane, 1-carbonylamino-1-methyl-2-phenylethane, carbonylaminocyclohexane, thiocarbonylaminoethane, thiocarbonylaminopropane, 1-thiocarbonylamino-1,1,1-trimethylmethane, 2-thiocarbonylamino-butane, 2-thiocarbonylamino-propane, 3-thiocarbonylamino-methyl-heptane, 3-thiocarbonylamino-3-ethyl-nonane, 1-thiocarbonylamino-1-phenyl-methane, 1-thiocarbonylamino-1-tolyl-methane, 1-thiocarbonylamino-1,1-dimethyl-1-phenylmethane, 1-thiocarbonyl-amino-1-methyl-2-phenylethane, thiocarbonylaminocyclohexane, cyanoethane, cyanopropane, 1-cyano-1,1,1-trimethylmethane, 2-cyano-butane, 2-cyano-propane, 3-cyanomethyl-heptane, 3-cyano-3-ethyl-nonane, 1-cyano-1-phenyl-methane, 1-cyano-1-tolyl-methane, 1-cyano-1,1-dimethyl-1-phenylmethane, 1-cyano-1-methyl-2-phenylethane, cyanocyclohexane, cyanatoethane, cyanatopropane, 1-cyanato-1,1,1-trimethylmethane, 2-cyanato-butane, 2-cyanato-propane, 3-cyanatomethyl-heptane, 3-cyanato-3-ethyl-nonane, 1-cyanato-1-phenyl-methane, 1-cyanato-1-tolyl-methane, 1-cyanato-1,1-dimethyl 1-phenylmethane, 1-cyanato-1-methyl-2-phenylethane, cyanatocyclohexane, thiocyanatoethane, thiocyanatopropane, 1-thiocyanato-1,1,1-trimethylmethane, 2-thiocyanato-butane, 2-thiocyanato-propane, 3-thiocyanatomethyl-heptane, 3-thiocyanato-3-ethyl-nonane, 1-thiocyanato-1-phenyl-methane, 1-thiocyanato-1-tolyl -methane, 1-thiocyanato-1,1-dimethyl-1-phenylmethane, 1-thiocyanato-1-methyl-2-phenylethane, thiocyanatocyclohexane, isothiocyanatoethane, isothiocyanatopropane, 1-isothiocyanato-1,1,1-trimethylmethane, 2-isothiocyanato-butane, 2-isothiocyanato-propane, 3-isothiocyanatomethyl-heptane, 3-isothiocyanato-3-ethyl-nonane, 1-isothiocyanato-1-phenyl-methane, 1-isothiocyanato-1-tolyl-methane, 1-isothiocyanato-1,1-dimethyl-1-phenylmethane, 1-isothiocyanato-1-methyl-2-phenylethane, isothiocyanatocyclohexane, and the like.

Illustrative of the silyl compounds of Formula I(b) are azidotrimethylsilane, azidotriethylsilane, azidoethyldimethylsilane, azidotriphenylsilane, azidomethyldiethylsilane, azidoethyldiphenylsilane, azidotrioctylsilane, azidotricumylsilane, cyanotrimethylsilane, cyanotriethylsilane, cyanoethyldimethyl silane, cyanotriphenylsilane, cyanomethyldiethylsilane, cyanoethyldiphenylsilane, cyanotrioctylsil ane, cyanotricumylsilane, carbonylaminotrimethyl silane, carbonylaminotriethylsilane, carbonylaminoethyldimethylsilane, carbonylaminotriphenylsilane, carbonylaminomethyldiethylsilane, carbonylaminoethyldiphenylsilane, carbonylaminotrioctylsilane, carbonylaminotricumylsilane, thiocarbonylaminotrimethylsilane, thiocarbonylaminotriethylsilane, thiocarbonylaminoethyldimethylsilane, thiocarbonylaminotriphenylsilane, thiocarbonylaminomethyldiethylsilane, thiocarbonylaminoethyldiphenylsilane, thiocarbonylaminotrioctylsilane, thiocarbonylaminotricumylsilane, cyanatotrimethylsilane, cyanatotriethylsilane, cyanatoethyldimethylsilane, cyanatotriphenylsilane, cyanatomethyldiethylsilane, cyanatoethyldiphenylsilane, cyanatotrioctylsilane, cyanatotricumylsilane, thiocyanatotrimethylsilane, thiocyanatotriethylsilane, thiocyanatoethyldimethylsilane, thiocyanatotriphenylsilane, thiocyanatomethyldiethylsilane, thiocyanatoethyldiphenylsilane, thiocyanatotrioctylsilane, thiocyanatotricumylsilane, isothiocyanatotrimethylsilane, isothiocyanatotriethylsilane, isothiocyanatoethyldimethylsilane, isothiocyanatotriphenylsilane, isothiocyanatomethyldiethylsilane, isothiocyanatoethyldiphenylsilane, isothiocyanatotrioctylsilane, isothiocyanatotricumylsilane, and the like.

Also useful as nitrogen-containing initiators are disubstituted compounds of the formula

Y—Z—Y (III)

wherein Y is as defined above, and Z comprises a

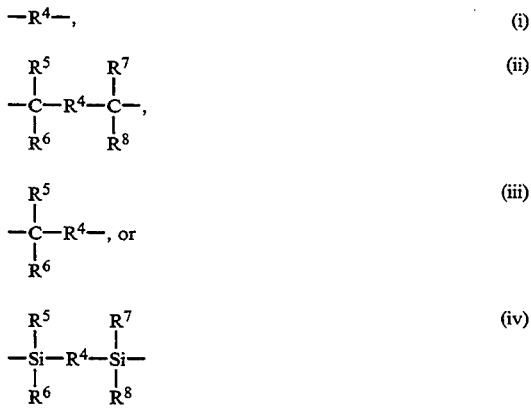

group wherein $R^5$, $R^6$, $R^7$ and $R^8$ are the same or different and comprise H hydrocarbyl, e.g., alkyl of from 1 to 100 carbon atoms (e.g., methyl, ethyl, isopropyl, butyl and the like), cycloalkyl of from 3 to 10 carbon atoms (e.g., cylcohexyl, cyclobutyl and the like), aryl of from 6 to 20 carbon atoms (e.g., phenyl, naphthyl and the like), or aralkyl and alkaryl of from 7 to 20 carbon atoms (e.g., tolyl, cresyl, xylyl, benzyl, ethylbenzyl and the like), and $R^4$ comprises —$C_aH_{2a}$—, or —Ar—, wherein a is an integer of from 3 to 20, and preferably 3 to 10, and wherein Ar is an arylene group of from 6 to 20 carbon atoms, or aryl-substituted arylene, e.g., $C_1$ to $C_{20}$ (preferably $C_1$ to $C_{10}$)alkyl mono- or di-substituted arylene group of from 7 to 40 carbon atoms (e . g., phenylene, naphthylene, mono- or di-alkyl substituted derivatives of the foregoing, and the like).

Illustrative of compounds of Formula III disubstituted with the above groups (i), (ii) and (iii) are: 2,4-bis-(azido)-2,4-dimethylpentane, bis (azido)-methane, 1,2-bis(azido)-ethane, 1,3-bisazido-propane, 2,2-bis(azido) -propane, 2,3-bisazido)-2,3-dimethylbutane, 1,5-bis-(azido)-pentane, 2,6-bis(azido)-heptane, 2,6-bis(azido)-2,6-dimethylheptane, bis(azido)benzene, bis(azidomethyl)benzene, bis(azidoethyl)benzene, bis(1-azidoethyl)-benzene, bis(1-azido-1-methylethyl)benzene, bis (2-azidopropyl)benzene, bis(azidomethyl)toluene, bis-(azidomethyl)xylene, bis(1-azidoethyl)toluene, bis(1-azidoethyl)xylene, bis(1-azido-1-methylethyl)toluene, bis(1-azido-1-methylethyl)xylene, bis (azidophenyl)methane, bis (azido-ethylphenyl)methane, bis(azidomethylphenyl)methane, 2,2-bis(azidomethylphenyl)propane, bis(1-azido-1-methylethylphenyl)methane, 2,4-bis(cyano)-2,4-dimethylpentane, bis(cyano)-methane, 1,2-bis(cyano)-ethane, 1,3-biscyano-propane, 2,2-bis(-cyano)-propane, 2,3-bis(cyano)-2,3-dimethylbutane, 1,5-bis(cyano)-pentane, 2,6-bis (cyano)-heptane, 2,6-bis(cyano)-2,6-dimethylheptane, bis(cyano)benzene, bis(cyanomethyl)benzene, bis(cyanoethyl)benzene, bis(1-cyanoethyl)benzene, bis(1-cyano-1-methylethyl) benzene, bis(2-cyanopropyl)benzene, bis(cyanomethyl)-toluene, bis(cyanomethyl)xylene, bis(1-cyanoethyl)toluene, bis(1-cyanoethyl)xylene, bis(1-cyano-1-methylethyl)toluene, bis(1-cyano-1-methylethyl)xylene, bis(-cyanophenyl)methane, bis(cyano-ethylphenyl)methane, bis(cyanomethylphenyl)methane, 2,2-bis( cyanomethylphenyl)propane, bis(1-cyano-1-methylethylphenyl)methane, 2,4-bis(carbonylamino)-2,4-dimethylpentane, bis(carbonylamino)-methane, 1,2-bis(carbonylamino)ethane, 1,3-bis(carbonylamino)-propane, 2,2-bis(carbonylamino)-propane, 2,3-bis(carbonylamino)-2,3- dimethylbutane, 1,5-bis(carbonylamino)-pentane, 2,6-bis(carbonylamino)-heptane, 2,6-bis(carbonylamino)-2,6-dimethylheptane, bis(carbonylamino)benzene, bis(carbonylaminomethyl)benzene, bis(carbonylaminoethyl)benzene, bis(1-carbonylaminoethyl)benzene, bis(1-carbonylamino-1-methylethyl)benzene, bis(2-carbonylaminopropyl)benzene, bis(carbonylaminomethyl)toluene, bis(carbonylaminomethyl)xylene, bis(1-carbonylaminoethyl)toluene, bis(1-carbonylaminoethyl)xylene, bis(1-carbonylamino-1-methylethyl)toluene, bis(1-carbonyl-amino-1-methylethyl)xylene, bis(carbonylaminophenyl)methane, bis(carbonylaminoethylphenyl)methane, bis(carbonylaminomothylphenyl)methane, 2,2-bis(carbonylaminoethylphenyl)propane, bis(1-carbonyl-amino-1-methylethylphenyl)methane, 2,4-bis(thiocarbonylamino)-2,4-dimethylpentane, bis(thiocarbonylamino)-methane, 1,2-bis(thiocarbonylamino)ethane, 1,3-bis(thiocarbonylamino)propane, 2,2-bis(thiocarbonylamino)propane, 2,3-bis(thiocarbonylamino)-2,3-dimethylbutane, 1,5-bis(thiocarbonylamino)-pentane, 2,6-bis(thiocarbonylamino)-heptane, 2,6-bis(thiocarbonylamino)-2,6-dimethylheptane, bis(thiocarbonylamino)benzene, bis(thiocarbonylaminomethyl)benzene, bis(thiocarbonylaminoethyl)benzene, bis(1-thiocarbonylaminoethyl)benzene, bis(1-thiocarbonylamino-1-methylethyl)benzene, bis(2-thiocarbonylaminopropyl)benzene, bis(thiocarbonylaminomethyl)toluene, bis(thiocarbonylaminomethyl)xylene, bis(1-thiocarbonylaminoethyl)toluene, bis(1-thiocarbonylaminoethyl)xylene, bis(1-thiocarbonylamino-1-methylethyl)toluene, bis(1-thiocarbonylamino-1-methylethyl)xylene, bis(thiocarbonylaminophenyl)methane, bis(thiocarbonylaminoethylphenyl)methane, bis(thiocarbonylaminomothylphenyl)methane, 2,2-bis(thiocarbonylaminoethylphenyl)propane, bis(1-thiocarbonylamino-1-methylethylphenyl)methane, 2,4-bis(cyanato)-2,4-dimethylpentane, bis(cyanato)-methane, 1,2-bis(cyanato)-ethane, 1,3-biscyanato-propane, 2,2-bis(cyanato)-propane, 2,3-bis(cyanato)-2,3-dimethylbutane, 1,5-bis(cyanato)-pentane, 2,6-bis(cyanato)-heptane, 2,6-bis(cyanato)-2,6-dimethylheptane, bis(cyanato)benzene, bis(cyanatomethyl)benzene, bis(cyanatoethyl)benzene, bis(1-cyanatoethyl)benzene, bis(1-cyanato-1-methylethyl)benzene, bis(2-cyanatopropyl)benzene, bis(cyanatomethyl)toluene, bis(cyanatomethyl)xylene, bis(1-cyanatoethyl)toluene, bis(1-cyanatoethyl)xylene, bis(1-cyanato-1-methylethyl)toluene, bis(1-cyanato-1-methylethyl)xylene, bis(cyanatophenyl)methane, bis(cyanato-ethylphenyl)methane, bis(cyanatomethylphenyl)methane, 2,2-bis(cyanatomethylphenyl)propane, bis(1-cyanato-1-methylthylphenyl)methane, 2,4-bis(thiocyanato)-2,4-dimethylpentane, bis(thiocyanato)-methane, 1,2-bis(thiocyanato)-ethane, 1,3-bisthiocyanato-propane, 2,2-bis(thiocyanato)-propane, 2,3-bis(thiocyanato)-2,3-dimethylbutane, 1,5-bis(thiocyanato)-pentane, 2,6-bis(thiocyanato)-heptane, 2,6-bis(thiocyanato)-2,6-dimethylheptane, bis(thiocyanato)benzene, bis(thiocyanatomethyl)benzene, bis(thiocyanatoethyl)benzene, bis(1-thiocyanatoethyl)benzene, bis(1-thiocyanato-1-methylethyl)benzene, bis(2-thiocyanatopropyl)benzene, bis(thiocyanatomethyl)toluene, bis(thiocyanatomethyl)xylene, bis(1-thiocyanatoethyl)toluene, bis(1-thiocyanatoethyl)xylene, bis(1-thiocyanato-1-methylethyl)toluene, bis(1-thiocyanato-1-methylethyl)xylene, bis(thiocyanatophenyl)methane, bis(thiocyanato-ethylphenyl)methane, bis(thiocyanatomethylphenyl)methane, 2,2-bis(thiocyanatomethylphenyl)propane, bis(1-thiocyanato-1-methylethylphenyl)methane, 2,4-bis(isothiocyanato)-2,4-dimethylpentane, bis(isothiocyanato)-methane, 1,2-bis(isothiocyanato)-ethane, 1,3-bisisothiocyanato-propane, 2,2-bis(isothiocyanato)-propane, 2,3-bis(isothiocyanato)-2,3-dimethylbutane, 1,5-bis(isothiocyanato)-pentane, 2,6-bis(isothiocyanato)-heptane, 2,6-bis(isothiocyanato)-2,6-dimethylheptane, bis(isothiocyanato)benzene, bis(isothiocyanatomethyl)benzene, bis(isothiocyanatoethyl)benzene, bis(1-isothiocyanatoethyl)benzene, bis(1-isothiocyanato-1-methylethyl)benzene, bis(2-isothiocyanatopropyl)benzene, bis(isothiocyanatomethyl)toluene, bis(isothiocyanatomethyl)xylene, bis(1-isothiocyanatoethyl)toluene, bis(1-isothiocyanatoethyl)xylene, bis(1-isothiocyanato-1-methylethyl)toluene, bis(1-isothiocyanato-1-methylethyl)xylene, bis(isothiocyanatophenyl)methane, bis(isothiocyanato-ethylphenyl)methane, bis(isothiocyanatomethylphenyl)methane, 2,2-bis(isothiocyanatomethylphenyl)propane, and the like.

Illustrative of the compunds of Formula III disubstituted with the groups (iv) are bis(1-isothiocyanato-1-methylethylphenyl)methane, bis(azidodimethylsilyl) methane, bis/azidodiethylsilyl) methane, 1,1-bis-(azidodimethylsilyl) ethane, 1,2-bis (azidodimethylsilyl) ethane, bis/azidoethyldimethylsilyl) phenylmethane, 1,1-bis(azidodiethylmethylsilyl)-2-phenylethane, bis(cyanodimethylsilyl) methane, bis/cyanodiethylsilyl) methane, 1,1-bis(cyanodimethylsilyl) ethane, 1,2-bis (cyanodimethylsilyl) ethane, bis/cyanoethyldimethylsilyl) phenylmethane, 1,1-bis(cyanodiethylmethylsilyl)-2-phenylethane, bis(carbonylaminodimethylsilyl) methane, bis/carbonylaminodiethylsilyl) methane, 1,1-bis(carbonylaminodimethylsilyl) ethane, 1,2-bis (carbonylaminodimethylsilyl) ethane, bis/carbonylaminoethyldimethylsilyl) phenylmethane, 1,1-bis(carbonylaminodiethylmethylsilyl)-2-phenylethane, bis(thiocarbonylaminodimethylsilyl) methane, bis/thiocarbonylaminodiethylsilyl) methane, 1,1-bis(thiocarbonylaminodimethylsilyl) ethane, 1,2-bis (thiocarbonylaminodimethylsilyl) ethane, bis/thiocarbonylaminoethyldimethylsilyl) phenylmethane, 1,1-bis(thiocarbonylaminodiethymethylsiyl)-2-phenyl ethane, bis(cyanatodimethylsilyl) methane, bis/cyanatodiethylsilyl) methane, 1,1-bis(cyanatodimethylsilyl) ethane, 1,2-bis (cyanatodimethylsilyl) ethane, bis/cyanatoethyldimethylsilyl) phenylmethane, 1,1-bis(cyanatodiethylmethylsilyl)-2-phenyl ethane, bis(thiocyanatodimethylsilyl) methane, bis/thiocyanatodiethylsilyl) methane, 1,1-bis(thiocyanatodimethylsilyl) ethane, 1,2-bis (thiocyanatodimethylsilyl) ethane, bis/thiocyanatoethyldimethylsilyl) phenylmethane, 1,1-bis(thiocyanatodiethylmethylsilyl)-2-phenylethane, bis(isothiocyanatodimethylsilyl) methane, bis/isothiocyanatodiethylsilyl) methane, 1,1-bis(isothiocyanatodimethylsilyl) ethane, 1,2-bis (isothiocyanatodimethylsilyl) ethane, bis/isothiocyanatoethyldimethylsilyl) phenylmethane, 1,1-bis(isothiocyanatodiethylmethylsilyl)-2-phenylethane, and the like.

The method of the instant invention may be illustrated, for instance, by the production of polyisobutylene functionalized with terminal azido, cyano, carbonylamino or thiocarbonylamino groups. In preferred embodiments of the invention, isobutene monomer is provided in a low-boiling, low-freezing alkyl halide solvent. An azido-providing species such as hydrazoic acid may be added to the monomer.

Applicants have surprisingly discovered that functionalization by the azide, cyano, carbonylamino, cyanato, thiocyanato, isothiocyanato, or thiocarbonylamino group can be obtained during the cationic polymerization of the selected toohomer (e. g., isobutylene) in the liquid phase. In order to obtain this result, the azide, cyano, carbonylamino, cyanato, thiocyanato, isothiocyanato, or thiocarbonylamino group is introduced in the form of a suitably designed molecule including a release moiety enabling the Y group to migrate to the electrophilic site of a growing polymer chain. Without being bound, we believe that these N-containing initiators having Y groups which are mobile in the presence of Friedel-Crafts catalysts provide functionalization (during polymerization) of the growing polymer chain ends which is believed to occur by reaction of the electrophilic site with the complex anion containing the Y constituent. This result is surprising since, for example, the azide anion is known to be a poor leaving group. The introduction of the initiator (also herein sometimes termed the "cocatalyst") simultaneously provides an initiation site and a functionalization system enabling the following reaction:

within the polymer chain, as illustrated by reference to the following equation:

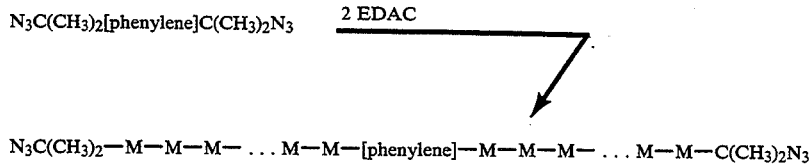

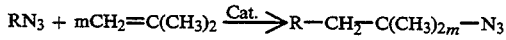

where R is the release moiety of the co-catalyst: $N_3$ is the nitrogen-containing functional group, "Cat." is, for instance, a metal halide catalyst, and m is the degree of polymerization. While not wishing to be bound thereby, it is believed that the polymerizations in accordance with the process of this invention proceed by the formation of an ion pair of the selected nitrogen-containing initiator and Lewis acid catalyst, followed by monomer insertion. An alternative mechanism could be insertion of the monomer into a strongly polarized covalent bond, according to the generally admitted mechanism of pseudocationic polymerization. In the case of monofunctional N-containing initiators of this invention (e.g., $\phi C(CH_3)_2 N_3$), the resulting product then theoretically contains functionality at each end. That is, one end of the polymer corresponds to the "R" group of the nitrogen-containing initiator and the other corresponds to the "X" group of the initiator. This can be illustrated by reference to the following equation:

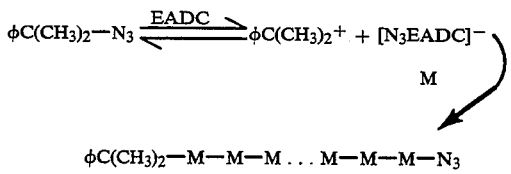

wherein EADC represents ethyl aluminum dichloride and M represents the selected cationically polymerizable monomer.

In the case of a difunctional initiator of this invention (e.g., $N_3C(CH_3)_2[phenylene]C(CH_3)_2N_3$), the resulting polymer product will theoretically contain an "Y" functionality at each end of the polymer, and a "Z" group Of course, the $RY_n$ initiator compound, when $n>2$, is multifunctional and additional branching of the polymer can occur due to polymer growth at multiple sites on the intiators of this invention.

It will be understood that the above polyolefin "M-M.." segments are not necessarily all of the same length.

In the above reactions the Y-group (e.g., the $-N_3$, azide group) in the N-containing initiator has sufficient mobility to be transferred from this molecule to the growing chain end. Preferably, the Lewis Acid selected to catalyze the polymerization is introduced at a concentration corresponding to the molar equivalents of the azide (or other N-containing group of this invention) charged to the polymerization zone.

The preferred N-containing initiators employed in this invention are those in which the "Y" group is covalently bound to a secondary or tertiary carbon, and those in which the "R" release moiety is resonance stabilized or otherwise capable of delocalizing charge. Preferably the "R" release moiety is an allylic or benzylic species. Again, as explained above, the initiator can be monofunctional, di or multifunctional, and can contain more than one of the above initiators, although it is preferred that di or multifunctional initiators contain only a single such type of "Y" group. The functionality of the polymer product is then equal to one, two or more, accordingly. One of the preferred molecules is, for instance, 2-azido-2-phenyl-propane in which the azide group is at the same time tertiary and of the benzylic type. We have also obtained good results using hydrazoic acid to play the role of the molecule containing an azide group. In the latter case, the proton of the acid is the fragment on which polymerization is initiated (by cocatalysis), and the functionalization is the result of the termination reaction.

The catalyst can comprise a Friedel-Crafts catalyst or other Lewis Acid cationic polymerization catalyst. The Friedel-Crafts catalyst can comprise an organometallic compound of the formula $$R^9{}_{n'} M'T_{n''} \quad (IV)$$

wherein M' is a metal selected from the group consisting of Ti, Al, Sn, Fe, and Zn, $R^9$ is a hydrocarbyl group (preferably a $C_1$ to $C_7$ alkyl group, and most preferably a $C_1$ to $C_4$ alkyl group), T is a halogen or mixture of halogens, preferably chlorine or bromine, and most preferably chlorine, or a group of atoms corresponding to the conjugated base of strong Bronsted acids such as $ClO_4$ or $CF_3SO_3$, and wherein n' is an integer of from 0 to (v-1) and n'' is an integer of from 1, wherein v is the valence of M', with the proviso that $(n'+n'') \leq v$. Preferred are organoaluminum halides, aluminum halides, boron trifluoride, and titanium halides. Most preferred are organoaluminum chlorides, aluminum chlorides, and titanium chlorides. The foregoing organometallic halide compounds are known in the art and can be prepared by conventional means, e.g., by the process described in U.S. Pat. No. 4,151,113 and the references cited therein. Other Lewis Acid catalysts comprise halides (preferably chlorides or bromides) of B and S, such as $BCl_3$, $BF_3$, $S_6F_5$, and the mixed halides thereof such as $BC_1F_2$, and the various "sesqui" derivatives of elements of Group IIIA of the Periodict Table, such as $B_2(C_2H_5)_3(CF_3SO_3)_3$, $Al_2(C_2H_5)_3Cl_3$, and the like. Preferred catalysts are diethylaluminum chloride, ethylaluminum dichloride, or aluminum trichloride, titanium trichloride, boron trifluoride, titanium tetrachloride, and so on. Although insoluble catalysts may be used, the catalyst is preferably soluble in the reaction medium, and the exact concentration of the catalyst depends on the concentration of the molecule containing the "Y" group. Preferably, the N-containing initiator and Lewis Acid catalyst are charged to the polymerization zone in an "Y" group molar equivalents to moles of Lewis Acid catalyst in a ratio of from about 3:1 and 1:3. Results are enhanced as the above ratio approaches 1:1 and good results are obtained at ratios of from 5:4 to 4:5. Molecular weight of the product may be selected by altering the ratio of the moles of monomer to Y-group equivalents. Molecular weight increases as this latter ratio increases.

Suitable solvents include but are not limited to low-boiling alkyl halides, whether they are mono or polyhalides, the requirement being a reasonably low freezing point to be used at the preferred polymerization temperature. Illustrative solvents include alkanes (generally $C_2$-$C_{10}$ alkanes, including normal alkanes such as propane, normal butane, normal pentane, normal hexane, normal heptane, normal octane, normal nonane and normal decane, and branched-alkanes including isobutane, isopentane, isohexane, 3-methylpentane, 2,2-dimethylbutane, 2,3-dimethylbutane and the like), alkenes and alkenyl halides (such as vinyl chloride), carbon disulfide, chloroform, ethylchloride, N-butyl chloride, methylene chloride, methylchloride, 1,2-dichloroethane, 1,1,2,2-tetrachloroethane, sulfur dioxide, acetic anhydride, carbon tetrachloride, nitroethane, acetonitrile, neopentane, benzene, toluene, methylcyclohexane, chlorobenzene, ethylidene dichloride, propyl dichloride, to name a few of the representative liquid diluents or solvents useful in cationic polymerizations. Mixed solvents can also be used. The preferred solvents are methyl and ethyl chloride, methylene dichloride and propyl chloride, hexane, heptane and purified petroleum ether.

Any cationically polymerizable monomers may be used, including straight and branched chain alpha olefins, isoolefins, alicyclic mono-olefins, cycloaliphatic compounds, styrene derivatives, indene and derivatives, and other mono-olefins and heterocyclic cationically polymerizable monomers identified in Joseph P. Kennedy "Cationic Polymerization of Olefins: A Critical Inventory" pages 39–53 (John Wiley & Sons, 1975). Exemplary of such additional cationic polymerizable monomers are ethylene cyclopropane, 2-cyclopropylpropylene, 1,1-dicyclopropylethylene, cyclopentene, methylenecyclopropane, methylenecyclobutane, methylenecyclopentene, ethylenecyclopentene, 3-methylcyclopentene, 1-methylcyclopentene, 3-cyclopentylprop-1-ene, cyclohexene, 1-methylcyclohexene, 3-methylcyclohexene, methylenecyclohexane, 1-methyl-2-methylenecyclohexane, 1-methyl-3-methylenecyclohexane, ethylenecyclohexane, 3-cyclohexyl-prop-1-ene, methylenecycloheptene, methylenecyclooctene, methylenecyclotridecene, cyclopropane, ethylcyclopropane, 3-cyclopropylpropane, 2-cyclopropylpropane, 1,1-dimethylcyclopropane, 1,2-dimethylcyclopropane, bicyclo[3.1.0]hexane, bicyclo[4.1.0]heptane, bicyclo[5.1.0]octane, bicyclo[6.1.0]nonane, bicyclo[10.1.0]-tridecane, 1-methyl-bicyclo[4.1.0]heptane, 2-methyl-bicyclo[4.1.0]heptane, 1-methyl-bicyclo[5.1.0]octane, 1-methyl-bicyclo[6.1.0]nonane, spiro[2.2]pentane, spiro[2.4]heptane, spiro[2.5]octane, spiro[2.6]nonane, spiro[2.7]decane, spiro[2.12]pentadecane, bicyclo [6.1.0]non-3-ene, bicyclo[2.2.1]hept-2-ene, 5-methyl-bicyclo[2.2.1]hept-2-ene, 2-methylene-bicyclo[2.2.1]heptane, 2-methylene-3,3-bimethyl-bicyclo[2.2.1]heptane, 2-ethylene-bicyclo[2-2.1]heptane, 2[1-methylethylene]-bicyclo[2.2.1]heptane, 6-methyl-bicyclo[2.2.2oct-2-ene, styrene, methylstyrene, ethylstyrene, dodecylstyrene, isopropylstyrene, tertiarybutylstyrene, indene, biocyclopentane, 1-methylindene, -methyl indene, 3-methylindene, 5-methylindene, 6-methylindene, 7-methyl indene, 1,1-dimethylindene, 2,3-dimethylindene, 4, 7-dimethylindene, and the like. Particularly valuable polymers can be prepared from isoolefins of from 4 to 20 carbon atoms or mixtures thereof to produce homopolymers and copolymers. Examples of such unsaturated hydrocarbons include but are not restricted to isobutylene, 2-methylbutene, 3-methylbutene-1,4-methylpentene-1, and beta-pinene. Other cationically polymerizable monomers which may be employed include heterocyclic monomers such as oxazolines and others known to add onto polarized covalent bonds.

Mixtures of cationically polymerizable monomers can be employed as feedstock to the polymerization zone if desired. E.g., copolymers, terpolymers and higher interpolymers can be prepared by employing a mixture of two, three or more of the above monomers.

Preferred feedstocks to the polymerization zone comprise pure isobutylene and mixed $C_4$ hydrocarbon feedstocks containing isobutylene, such as a $C_4$ cut resulting from the thermal or catalytic cracking operation of, for example, naphtha. Thus, suitable isobutylene feedstocks will typically contain at least 10%, and up to 100% isobutylene, by weight, based on the weight of the feed. In addition to isobutylene, conventional $C_4$ cuts suitable for use as a feedstock which are of industrial importance typically will contain between about 10 and 40% butene-1, between about 10 and 40% butene-2, between about 40 and 60% isobutane, between about 4 and 10% n-butane, and up to about 0.5 butadiene, all percentages being by weight based on the feed weight. Feedstocks containing isobutylene may also contain other non-$C_4$ polymerizabte olefin monomers in minor amounts, e.g., typically less than about 25%, preferably less than about 10%, and most preferably less than 5%, such as propadiene, propylene and $C_5$ olefins.

The term "polybutene" as employed herein is intended to include not only homopolymers of isobutylene but also copolymers of isobutylene and one or more other $C_4$ polymerizable monomers of conventional $C_4$ cuts as well as non-$C_4$ ethylenically unsaturated olefin monomers containing typically from about 3 to about 6, and preferably from about 3 to about 5 carbon atoms, provided such copolymers contain typically at least 50%, preferably at least 65%, and most preferably at least 80% isobutylene units, by weight, based on the polymer number average molecular weight ($\overline{M}n$). The substantially selective polymerizability of isobutylene under the conditions specified herein ensures the aforedescribed minimum isobutylene content.

P re ferably the polymerization medium is substantially free of substances which are capable of initiating the catalysis other than the selected N-containing initiator (or mixtures of initiators) of this invention. Therefore, the polymerization medium preferably will be substantially free of added conventionally-employed cationic polymerization initiators or promoters (i.e., co-catalysts) such as water, alcohols, carboxylic acids and acid anhydrides, acid anhydrides, HF, ethers or mixtures thereof. The alcohols which should be excluded are straight or branched chain, aliphatic, aromatic, or mixed aliphatic/aromatic alcohols containing from 1 to 30 carbon atoms. Likewise the carboxylic acid, acid anhydride and/or ether promoters to be excluded are halogen substituted or unsubstituted, straight or branched chain, aliphatic, aromatic or mixed aliphatic/aromatic acids and ether containing from about 1 to about 30 carbon atoms.

The polymerization reaction medium preferably contains less than about 20 weight ppm of water, and less than 5 weight ppm of mercaptans, all of which can function as poisons to Lewis Acid catalysts. The olefin feed can be treated to achieve the above desired levels by conventional means, e.g., by use of mole sieves and caustic washing to remove mercaptans and water to the above, and dienes (if desired).

The polymerization reaction may be conducted batchwise or in semicontinuous or continuous operation in which continuous streams of ingredients are delivered to the reactor, and an overflow of a slurry or solution of polymer is taken out for the recovery of the polymer therefrom. The preferred mode of reaction, however, is on a continuous basis using a continuous flow stirred reactor wherein feed is continuously introduced into the reactor and product continuously removed from the reactor. Typically, the monomer feed rate and product removal rate are set to be essentially constant and equal to accurately control the $\overline{M}_n$ and MWD of the product.

The amount of Lewis Acid catalyst employed in the process of the present invention can be controlled in conjunction with the reaction temperature to achieve the target $\overline{M}_n$ of polymer but is also sought to be minimized to reduce undesired isomerizations believed to be induced thereby. More specifically, the lower the catalyst concentration in the reaction phase, the higher will be the polymer molecular weight and vice versa. However, the polymer molecular weight is extremely sensitive to the reaction temperature and the lower the reaction temperature, the higher will be the molecular weight and vice versa. Accordingly, to the extent that plant equipment and economic factors permit, the polybutene number average molecular weight ($\overline{M}_n$) is preferably controlled through manipulation of the reaction temperature. However, as a matter of convenience and for reasons of inherent limitations in plant design, the temperature control is typically supplemented with control of the catalyst feed rate to fine tune and achieve a particular target polymer molecular weight. Control of the polymer molecular weight within defined limits of a selected target polymer molecular weight is particularly important when the polymer is intended for use in lubricating oils as a dispersant.

The catalyst amount also affects the conversion of the olefin monomer and yield of polymer, with higher amounts of Lewis Acid catalyst typically achieving higher conversions and yields. Unfortunately, Lewis Acid catalyst is responsible for isomerizations which reduce the reactivity of the polymer product. Thus, in the process of the present invention, one also seeks to minimize catalyst concentration while compensating for the drop in conversion which would otherwise be induced thereby with longer polymerization times.

In view of the above, and of the fact that the Lewis Acid is complexed more or less strongly by the nitrogen-containing groups present in the reaction medium, the catalyst will be employed in sufficient amount to prevent contact between the growing chain ends with the nitrogen-containing groups. In other words, the preferred catalyst concentration will be that corresponding to the stoichiometry relatively to the nitrogen-containing compound. More specifically, the catalyst will be employed at a ratio of moles of Lewis Acid to equivalents of nitrogen-containing compound of typically from about 0.5:1 to about 2:1, and preferably from about 0.8:1 to 1.3:1.

The polymerization reaction is conducted in the liquid phase to induce linear or chain type polymerization in contradistinction to ring or branch formation. Thus, if a feed is used which is gaseous under ambient conditions, it is preferred to control the reaction pressure and/or dissolve the feed in an inert solvent or liquid diluent, in order to maintain the feed in the liquid phase. Typical C4 cuts comprising the feed are liquid under pressure and do not need a solvent or diluent.

Thus, where the selected Lewis Acid catalyst is normally a gas (e.g., BF$_3$, and the like) the catalyst is typically introduced into the reactor as gas which is partially or completely dissolved in a pressurized liquid in the reactor.

Polymerization pressures can range typically from about 25 to about 500, and preferably from about 100 to about 300, kpa.

The N-containing initiator can be introduced to the monomer feed, or to the reaction mixture, in liquid form preferably separately from the Lewis Acid catalyst. Preferably, the monomer is not contacted with the Lewis Acid catalyst in the absence of the N-containing initiator of this invention.

The temperature at which the polymerizations are carried out is important, since temperatures which are too high tend to decrease the functionalization degree. The usual polymerization temperature range is between about $-100°$ and $+10°$ C. Preferably, the polymerizations are performed at a temperature below about $-20°$ C., preferably between $-80°$ and $-20°$ C., e.g. at a temperature of about $-70°$ C.

The liquid phase reaction mixture temperature is controlled by conventional means. The particular reaction temperature is selected to achieve the target molecular weight, and preferably is not allowed to vary more than $\pm 0.5°$ C. from the selected value, while the catalyst and/or promoter feed rate is varied slightly to achieve the desired $\overline{M}_n$ to compensate for variations in monomer distribution in the feed composition.

Preferably, the reactor contents are stirred to achieve even catalyst distribution therein.

The polymerization reaction can be conducted batchwise, semi-continuously or completely continuously in the conventional manner.

Average polymerization times can vary from 10 to about 120, preferably from about 15 to about 45 (e.g., about 20 to about 30), and most preferably from about 15 to about 25 minutes.

The quench materials used to achieve quench are conventional and include the same materials discussed above as conventional cationic polymerization initiators or promoters with the exception that excess quantities are employed in amounts sufficient to deactivate the catalyst. Thus, while any amount of quenching medium effective to deactivate the catalyst may be employed, it is contemplated that such effective amount be sufficient to achieve a molar ratio of quench medium to Lewis Acid catalyst of typically from about 1:1 to about 1000:1, preferably from about 25:1 to about 500:1, and most preferably from about 100:1 to about 300:1.

Quench is conducted by introducing the quench medium into the polymer product. Typically, the polymer product is maintained under pressure during the quench sufficient to avoid vaporization of any gaseous Lewis Acid catalyst (if one is employed) and other components of the mixture. The temperature of the quenching medium is not critical and, e.g., can comprise room temperature or lower.

In a batch system, quench can be performed in the reactor or preferably on the product after it is withdrawn from the reactor. In a continuous system, the quench will typically be performed after it exits the reactor.

After quench, the polymerization product is typically subjected to conventional finishing steps which include a caustic/$H_2O$ wash to extract catalyst residue, a hydrocarbon/aqueous phase separation step wherein deactivated and extracted Lewis Acid catalyst is isolated in the aqueous phase, and a water washing step to remove residual amounts of neutralized catalyst. The polymer is then typically stripped in a debutanizer to remove unreacted volatile monomers, followed by a further stripping procedure to remove light end polymer (e.g., $C_{24}$ carbon polymer). The stripped polymer is then typically dried by $N_2$.

The novel polymers of this invention comprise terminally substituted polymers derived from any of the above-discussed cationically polymerizable monomers. The polymers will generally contain at least 5 monomer units per polymer chain, and will more usually be characterized by number average molecular weights of form about 300 to 50,00 or more, and more typically of from about 1,000 to 20,000. Polymers having number average molecular weights of from about 700 to about 5,000 are preferred for lubricating oil and fuel additive uses.

The polymers will comprise terminally substituent "Y" groups on one end, and a terminal "R" group on the other end when the nitrogen-containing initiator comprises a R-Y or R*-Y compound. Illustrative of the mono-substituted polymers of this invention therefore are those set forth in Table A below wherein R and R* are as prevsiouly defined and polymer* comprises a polymer derived from at least one cationically polymerizable monomer.

TABLE A

| R | Polymer* | Y |
|---|---|---|
| H— | polyisobutylene | —$N_3$ |
| $CH_3$ | polyisobutylene | —$N_3$ |
| $C_2H_5$— | polyisobutylene | —$N_3$ |
| $\phi CH_2$— | polyisobutylene | —$N_3$ |
| $CH_3\phi$- | polyisobutylene | —$N_3$ |
| $\phi$- | polyisobutylene | —$N_3$ |
| $(CH_3)_2CH\phi$- | polyisobutylene | —$N_3$ |

TABLE A-continued

| R | Polymer* | Y |
|---|---|---|
|  | polyisobutylene | —$N_3$ |
| $\phi C(CH_3)_2$— | polyisobutylene | —$N_3$ |
| $\phi C(CH_3)(C_2H_5)$— | polyisobutylene | —$N_3$ |
| $\phi CH_2C(CH_3)_2$— | polyisobutylene | —$N_3$ |
| $(CH_3)_3Si$— | polyisobutylene | —$N_3$ |
| $(C_2H_5)_3Si$— | polyisobutylene | —$N_3$ |
| $(CH_3)_2Si(C_2H_5)$— | polyisobutylene | —$N_3$ |
| $(CH_3)Si(C_2H_5)_2$— | polyisobutylene | —$N_3$ |
| $(C_3H_7)_3Si$— | polyisobutylene | —$N_3$ |
| $\phi Si(CH_3)_2$— | polyisobutylene | —$N_3$ |
| $(\phi)_2Si(CH_3)$— | polyisobutylene | —$N_3$ |
| $\phi_3Si$— | polyisobutylene | —$N_3$ |
| $(C_6H_{13})_3Si$— | polyisobutylene | —$N_3$ |
| $(C_8H_{17})_3Si$— | polyisobutylene | —$N_3$ |
| H— | polybutylene | —$N_3$ |
| $CH_3$ | polybutylene | —$N_3$ |
| $C_2H_5$— | polybutylene | —$N_3$ |
| $\phi CH_2$— | polybutylene | —$N_3$ |
| $CH_3\phi$- | polybutylene | —$N_3$ |
| $\phi$- | polybutylene | —$N_3$ |
| $(CH_3)_2CH\phi$- | polybutylene | —$N_3$ |
|  | polybutylene | —$N_3$ |
| $\phi C(CH_3)_2$— | polybutylene | —$N_3$ |
| $\phi C(CH_3)(C_2H_5)$— | polybutylene | —$N_3$ |
| $\phi CH_2C(CH_3)_2$— | polybutylene | —$N_3$ |
| $(CH_3)_3Si$— | polybutylene | —$N_3$ |
| $(C_2H_5)_3Si$— | polybutylene | —$N_3$ |
| $(CH_3)_2Si(C_2H_5)$— | polybutylene | —$N_3$ |
| $(CH_3)Si(C_2H_5)_2$— | polybutylene | —$N_3$ |
| $(C_3H_7)_3Si$— | polybutylene | —$N_3$ |
| $\phi Si(CH_3)_2$— | polybutylene | —$N_3$ |
| $(\phi)_2Si(CH_3)$— | polybutylene | —$N_3$ |
| $\phi_3Si$— | polybutylene | —$N_3$ |
| $(C_6H_{13})_3Si$— | polybutylene | —$N_3$ |
| $(C_8H_{17})_3Si$— | polybutylene | —$N_3$ |
| H— | polypropylene | —$N_3$ |
| $CH_3$ | polypropylene | —$N_3$ |
| $C_2H_5$— | polypropylene | —$N_3$ |
| $\phi CH_2$— | polypropylene | —$N_3$ |
| $CH_3\phi$- | polypropylene | —$N_3$ |
| $\phi$- | polypropylene | —$N_3$ |
| $(CH_3)_2CH\phi$- | polypropylene | —$N_3$ |
|  | polypropylene | —$N_3$ |
| $\phi C(CH_3)_2$— | polypropylene | —$N_3$ |
| $\phi C(CH_3)(C_2H_5)$— | polypropylene | —$N_3$ |
| $\phi CH_2C(CH_3)_2$— | polypropylene | —$N_3$ |
| $(CH_3)_3Si$— | polypropylene | —$N_3$ |
| $(C_2H_5)_3Si$— | polypropylene | —$N_3$ |
| $(CH_3)_2Si(C_2H_5)$— | polypropylene | —$N_3$ |
| $(CH_3)Si(C_2H_5)_2$— | polypropylene | —$N_3$ |
| $(C_3H_7)_3Si$— | polypropylene | —$N_3$ |
| $\phi Si(CH_3)_2$— | polypropylene | —$N_3$ |
| $(\phi)_2Si(CH_3)$— | polypropylene | —$N_3$ |
| $\phi_3Si$— | polypropylene | —$N_3$ |
| $(C_6H_{13})_3Si$— | polypropylene | —$N_3$ |
| $(C_8H_{17})_3Si$— | polypropylene | —$N_3$ |
| H— | polystyrene | —$N_3$ |
| $CH_3$ | polystyrene | —$N_3$ |
| $C_2H_5$— | polystyrene | —$N_3$ |
| $\phi CH_2$— | polystyrene | —$N_3$ |
| $CH_3\phi$- | polystyrene | —$N_3$ |

TABLE A-continued

| R | Polymer* | Y |
|---|---|---|
| φ- | polystyrene | —N$_3$ |
| (CH$_3$)$_2$CHφ- | polystyrene | —N$_3$ |
| cyclohexyl- | polystyrene | —N$_3$ |
| φC(CH$_3$)$_2$— | polystyrene | —N$_3$ |
| φC(CH$_3$)(C$_2$H$_5$)— | polystyrene | —N$_3$ |
| φCH$_2$C(CH$_3$)$_2$— | polystyrene | —N$_3$ |
| (CH$_3$)$_3$Si— | polystyrene | —N$_3$ |
| (C$_2$H$_5$)$_3$Si— | polystyrene | —N$_3$ |
| (CH$_3$)$_2$Si(C$_2$H$_5$)— | polystyrene | —N$_3$ |
| (CH$_3$)Si(C$_2$H$_5$)$_2$— | polystyrene | —N$_3$ |
| (C$_3$H$_7$)$_3$Si— | polystyrene | —N$_3$ |
| φSi(CH$_3$)$_2$— | polystyrene | —N$_3$ |
| (φ)$_2$Si(CH$_3$)— | polystyrene | —N$_3$ |
| φ$_3$Si— | polystyrene | —N$_3$ |
| (C$_6$H$_{13}$)$_3$Si— | polystyrene | —N$_3$ |
| (C$_8$H$_{17}$)$_3$Si— | polystyrene | —N$_3$ |
| H— | polymethylstyrene | —N$_3$ |
| CH$_3$ | polymethylstyrene | —N$_3$ |
| C$_2$H$_5$— | polymethylstyrene | —N$_3$ |
| φCH$_2$— | polymethylstyrene | —N$_3$ |
| CH$_3$φ- | polymethylstyrene | —N$_3$ |
| φ- | polymethylstyrene | —N$_3$ |
| (CH$_3$)$_2$CHφ- | polymethylstyrene | —N$_3$ |
| cyclohexyl- | polymethylstyrene | —N$_3$ |
| φC(CH$_3$)$_2$— | polymethylstyrene | —N$_3$ |
| φC(CH$_3$)(C$_2$H$_5$)— | polymethylstyrene | —N$_3$ |
| φCH$_2$C(CH$_3$)$_2$— | polymethylstyrene | —N$_3$ |
| (CH$_3$)$_3$Si— | polymethylstyrene | —N$_3$ |
| (C$_2$H$_5$)$_3$Si— | polymethylstyrene | —N$_3$ |
| (CH$_3$)$_2$Si(C$_2$H$_5$)— | polymethylstyrene | —N$_3$ |
| (CH$_3$)Si(C$_2$H$_5$)$_2$— | polymethylstyrene | —N$_3$ |
| (C$_3$H$_7$)$_3$Si— | polymethylstyrene | —N$_3$ |
| φSi(CH$_3$)$_2$— | polymethylstyrene | —N$_3$ |
| (φ)$_2$Si(CH$_3$)— | polymethylstyrene | —N$_3$ |
| φ$_3$Si— | polymethylstyrene | —N$_3$ |
| (C$_6$H$_{13}$)$_3$Si— | polymethylstyrene | —N$_3$ |
| (C$_8$H$_{17}$)$_3$Si— | polymethylstyrene | —N$_3$ |
| H— | polyisobutylene | —NCO |
| CH$_3$ | polyisobutylene | —NCO |
| C$_2$H$_5$— | polyisobutylene | —NCO |
| φCH$_2$— | polyisobutylene | —NCO |
| CH$_3$φ- | polyisobutylene | —NCO |
| φ- | polyisobutylene | —NCO |
| (CH$_3$)$_2$CHφ- | polyisobutylene | —NCO |
| cyclohexyl- | polyisobutylene | —NCO |
| φC(CH$_3$)$_2$— | polyisobutylene | —NCO |
| φC(CH$_3$)(C$_2$H$_5$)— | polyisobutylene | —NCO |
| φCH$_2$C(CH$_3$)$_2$— | polyisobutylene | —NCO |
| (CH$_3$)$_3$Si— | polyisobutylene | —NCO |
| (C$_2$H$_5$)$_3$Si— | polyisobutylene | —NCO |
| (CH$_3$)$_2$Si(C$_2$H$_5$)— | polyisobutylene | —NCO |
| (CH$_3$)Si(C$_2$H$_5$)$_2$— | polyisobutylene | —NCO |
| (C$_3$H$_7$)$_3$Si— | polyisobutylene | —NCO |
| φSi(CH$_3$)$_2$— | polyisobutylene | —NCO |
| (φ)$_2$Si(CH$_3$)— | polyisobutylene | —NCO |
| φ$_3$Si— | polyisobutylene | —NCO |
| (C$_6$H$_{13}$)$_3$Si— | polyisobutylene | —NCO |
| (C$_8$H$_{17}$)$_3$Si— | polyisobutylene | —NCO |
| H— | polybutylene | —NCO |
| CH$_3$ | polybutylene | —NCO |
| C$_2$H$_5$— | polybutylene | —NCO |
| φCH$_2$— | polybutylene | —NCO |
| CH$_3$φ- | polybutylene | —NCO |
| φ- | polybutylene | —NCO |
| (CH$_3$)$_2$CHφ- | polybutylene | —NCO |
| cyclohexyl- | polybutylene | —NCO |
| φC(CH$_3$)$_2$— | polybutylene | —NCO |
| φC(CH$_3$)(C$_2$H$_5$)— | polybutylene | —NCO |
| φCH$_2$C(CH$_3$)$_2$— | polybutylene | —NCO |
| (CH$_3$)$_3$Si— | polybutylene | —NCO |
| (C$_2$H$_5$)$_3$Si— | polybutylene | —NCO |
| (CH$_3$)$_2$Si(C$_2$H$_5$)— | polybutylene | —NCO |
| (CH$_3$)Si(C$_2$H$_5$)$_2$— | polybutylene | —NCO |
| (C$_3$H$_7$)$_3$Si— | polybutylene | —NCO |
| φSi(CH$_3$)$_2$— | polybutylene | —NCO |
| (φ)$_2$Si(CH$_3$)— | polybutylene | —NCO |
| φ$_3$Si— | polybutylene | —NCO |
| (C$_6$H$_{13}$)$_3$Si— | polybutylene | —NCO |
| (C$_8$H$_{17}$)$_3$Si— | polybutylene | —NCO |
| H— | polypropylene | —NCO |
| CH$_3$ | polypropylene | —NCO |
| C$_2$H$_5$— | polypropylene | —NCO |
| φCH$_2$— | polypropylene | —NCO |
| CH$_3$φ- | polypropylene | —NCO |
| φ- | polypropylene | —NCO |
| (CH$_3$)$_2$CHφ- | polypropylene | —NCO |
| cyclohexyl- | polypropylene | —NCO |
| φC(CH$_3$)$_2$— | polypropylene | —NCO |
| φC(CH$_3$)(C$_2$H$_5$)— | polypropylene | —NCO |
| φCH$_2$C(CH$_3$)$_2$— | polypropylene | —NCO |
| (CH$_3$)$_3$Si— | polypropylene | —NCO |
| (C$_2$H$_5$)$_3$Si— | polypropylene | —NCO |
| (CH$_3$)$_2$Si(C$_2$H$_5$)— | polypropylene | —NCO |
| (CH$_3$)Si(C$_2$H$_5$)$_2$— | polypropylene | —NCO |
| (C$_3$H$_7$)$_3$Si— | polypropylene | —NCO |
| φSi(CH$_3$)$_2$— | polypropylene | —NCO |
| (φ)$_2$Si(CH$_3$)— | polypropylene | —NCO |
| φ$_3$Si— | polypropylene | —NCO |
| (C$_6$H$_{13}$)$_3$Si— | polypropylene | —NCO |
| (C$_8$H$_{17}$)$_3$Si— | polypropylene | —NCO |
| H— | polystyrene | —NCO |
| CH$_3$ | polystyrene | —NCO |
| C$_2$H$_5$— | polystyrene | —NCO |
| φCH$_2$— | polystyrene | —NCO |
| CH$_3$φ- | polystyrene | —NCO |
| φ- | polystyrene | —NCO |
| (CH$_3$)$_2$CHφ- | polystyrene | —NCO |
| cyclohexyl- | polystyrene | —NCO |
| φC(CH$_3$)$_2$— | polystyrene | —NCO |
| φC(CH$_3$)(C$_2$H$_5$)— | polystyrene | —NCO |
| φCH$_2$C(CH$_3$)$_2$— | polystyrene | —NCO |
| (CH$_3$)$_3$Si— | polystyrene | —NCO |
| (C$_2$H$_5$)$_3$Si— | polystyrene | —NCO |
| (CH$_3$)$_2$Si(C$_2$H$_5$)— | polystyrene | —NCO |
| (CH$_3$)Si(C$_2$H$_5$)$_2$— | polystyrene | —NCO |
| (C$_3$H$_7$)$_3$Si— | polystyrene | —NCO |
| φSi(CH$_3$)$_2$— | polystyrene | —NCO |
| (φ)$_2$Si(CH$_3$)— | polystyrene | —NCO |
| φ$_3$Si— | polystyrene | —NCO |
| (C$_6$H$_{13}$)$_3$Si— | polystyrene | —NCO |

TABLE A-continued

| R | Polymer* | Y |
|---|---|---|
| (C$_8$H$_{17}$)$_3$Si— | polystyrene | —NCO |
| H— | polymethylstyrene | —NCO |
| CH$_3$ | polymethylstyrene | —NCO |
| C$_2$H$_5$— | polymethylstyrene | —NCO |
| φCH$_2$— | polymethylstyrene | —NCO |
| CH$_3$φ- | polymethylstyrene | —NCO |
| φ- | polymethylstyrene | —NCO |
| (CH$_3$)$_2$CHφ- | polymethylstyrene | —NCO |
| cyclohexyl | polymethylstyrene | —NCO |
| φC(CH$_3$)$_2$— | polymethylstyrene | —NCO |
| φC(CH$_3$)(C$_2$H$_5$)— | polymethylstyrene | —NCO |
| φCH$_2$C(CH$_3$)$_2$— | polymethylstyrene | —NCO |
| (CH$_3$)$_3$Si— | polymethylstyrene | —NCO |
| (C$_2$H$_5$)$_3$Si— | polymethylstyrene | —NCO |
| (CH$_3$)$_2$Si(C$_2$H$_5$)— | polymethylstyrene | —NCO |
| (CH$_3$)Si(C$_2$H$_5$)$_2$— | polymethylstyrene | —NCO |
| (C$_3$H$_7$)$_3$Si— | polymethylstyrene | —NCO |
| φSi(CH$_3$)$_2$— | polymethylstyrene | —NCO |
| (φ)$_2$Si(CH$_3$)— | polymethylstyrene | —NCO |
| φ$_3$Si— | polymethylstyrene | —NCO |
| (C$_6$H$_{13}$)$_3$Si— | polymethylstyrene | —NCO |
| (C$_8$H$_{17}$)$_3$Si— | polymethylstyrene | —NCO |
| H— | polyisobutylene | —CN |
| CH$_3$ | polyisobutylene | —CN |
| C$_2$H$_5$— | polyisobutylene | —CN |
| φCH$_2$— | polyisobutylene | —CN |
| CH$_3$φ- | polyisobutylene | —CN |
| φ- | polyisobutylene | —CN |
| (CH$_3$)$_2$CHφ- | polyisobutylene | —CN |
| cyclohexyl | polyisobutylene | —CN |
| φC(CH$_3$)$_2$— | polyisobutylene | —CN |
| φC(CH$_3$)(C$_2$H$_5$)— | polyisobutylene | —CN |
| φCH$_2$C(CH$_3$)$_2$— | polyisobutylene | —CN |
| (CH$_3$)$_3$Si— | polyisobutylene | —CN |
| (C$_2$H$_5$)$_3$Si— | polyisobutylene | —CN |
| (CH$_3$)$_2$Si(C$_2$H$_5$)— | polyisobutylene | —CN |
| (CH$_3$)Si(C$_2$H$_5$)$_2$— | polyisobutylene | —CN |
| (C$_3$H$_7$)$_3$Si— | polyisobutylene | —CN |
| φSi(CH$_3$)$_2$— | polyisobutylene | —CN |
| (φ)$_2$Si(CH$_3$)— | polyisobutylene | —CN |
| φ$_3$Si— | polyisobutylene | —CN |
| (C$_6$H$_{13}$)$_3$Si— | polyisobutylene | —CN |
| (C$_8$H$_{17}$)$_3$Si— | polyisobutylene | —CN |
| H— | polybutylene | —CN |
| CH$_3$ | polybutylene | —CN |
| C$_2$H$_5$— | polybutylene | —CN |
| φCH$_2$— | polybutylene | —CN |
| CH$_3$φ- | polybutylene | —CN |
| φ- | polybutylene | —CN |
| (CH$_3$)$_2$CHφ- | polybutylene | —CN |
| cyclohexyl | polybutylene | —CN |
| φC(CH$_3$)$_2$— | polybutylene | —CN |
| φC(CH$_3$)(C$_2$H$_5$)— | polybutylene | —CN |
| φCH$_2$C(CH$_3$)$_2$— | polybutylene | —CN |
| (CH$_3$)$_3$Si— | polybutylene | —CN |
| (C$_2$H$_5$)$_3$Si— | polybutylene | —CN |
| (CH$_3$)$_2$Si(C$_2$H$_5$)— | polybutylene | —CN |
| (CH$_3$)Si(C$_2$H$_5$)$_2$— | polybutylene | —CN |
| (C$_3$H$_7$)$_3$Si— | polybutylene | —CN |
| φSi(CH$_3$)$_2$— | polybutylene | —CN |
| (φ)$_2$Si(CH$_3$)— | polybutylene | —CN |
| φ$_3$Si— | polybutylene | —CN |
| (C$_6$H$_{13}$)$_3$Si— | polybutylene | —CN |
| (C$_8$H$_{17}$)$_3$Si— | polybutylene | —CN |
| H— | polypropylene | —CN |
| CH$_3$ | polypropylene | —CN |
| C$_2$H$_5$— | polypropylene | —CN |
| φCH$_2$— | polypropylene | —CN |
| CH$_3$φ- | polypropylene | —CN |
| φ- | polypropylene | —CN |
| (CH$_3$)$_2$CHφ- | polypropylene | —CN |
| cyclohexyl | polypropylene | —CN |
| φC(CH$_3$)$_2$— | polypropylene | —CN |
| φC(CH$_3$)(C$_2$H$_5$)— | polypropylene | —CN |
| φCH$_2$C(CH$_3$)$_2$— | polypropylene | —CN |
| (CH$_3$)$_3$Si— | polypropylene | —CN |
| (C$_2$H$_5$)$_3$Si— | polypropylene | —CN |
| (CH$_3$)$_2$Si(C$_2$H$_5$)— | polypropylene | —CN |
| (CH$_3$)Si(C$_2$H$_5$)$_2$— | polypropylene | —CN |
| (C$_3$H$_7$)$_3$Si— | polypropylene | —CN |
| φSi(CH$_3$)$_2$— | polypropylene | —CN |
| (φ)$_2$Si(CH$_3$)— | polypropylene | —CN |
| φ$_3$Si— | polypropylene | —CN |
| (C$_6$H$_{13}$)$_3$Si— | polypropylene | —CN |
| (C$_8$H$_{17}$)$_3$Si— | polypropylene | —CN |
| H— | polystyrene | —CN |
| CH$_3$ | polystyrene | —CN |
| C$_2$H$_5$— | polystyrene | —CN |
| φCH$_2$— | polystyrene | —CN |
| CH$_3$φ- | polystyrene | —CN |
| φ- | polystyrene | —CN |
| (CH$_3$)$_2$CHφ- | polystyrene | —CN |
| cyclohexyl | polystyrene | —CN |
| φC(CH$_3$)$_2$— | polystyrene | —CN |
| φC(CH$_3$)(C$_2$H$_5$)— | polystyrene | —CN |
| φCH$_2$C(CH$_3$)$_2$— | polystyrene | —CN |
| (CH$_3$)$_3$Si— | polystyrene | —CN |
| (C$_2$H$_5$)$_3$Si— | polystyrene | —CN |
| (CH$_3$)$_2$Si(C$_2$H$_5$)— | polystyrene | —CN |
| (CH$_3$)Si(C$_2$H$_5$)$_2$— | polystyrene | —CN |
| (C$_3$H$_7$)$_3$Si— | polystyrene | —CN |
| φSi(CH$_3$)$_2$— | polystyrene | —CN |
| (φ)$_2$Si(CH$_3$)— | polystyrene | —CN |
| φ$_3$Si— | polystyrene | —CN |
| (C$_6$H$_{13}$)$_3$Si— | polystyrene | —CN |
| (C$_8$H$_{17}$)$_3$Si— | polystyrene | —CN |
| H— | polymethylstyrene | —CN |
| CH$_3$ | polymethylstyrene | —CN |
| C$_2$H$_5$— | polymethylstyrene | —CN |
| φCH$_2$— | polymethylstyrene | —CN |
| CH$_3$φ- | polymethylstyrene | —CN |
| φ- | polymethylstyrene | —CN |
| (CH$_3$)$_2$CHφ- | polymethylstyrene | —CN |
| cyclohexyl | polymethylstyrene | —CN |
| φC(CH$_3$)$_2$— | polymethylstyrene | —CN |
| φC(CH$_3$)(C$_2$H$_5$)— | polymethylstyrene | —CN |
| φCH$_2$C(CH$_3$)$_2$— | polymethylstyrene | —CN |
| (CH$_3$)$_3$Si— | polymethylstyrene | —CN |
| (C$_2$H$_5$)$_3$Si— | polymethylstyrene | —CN |
| (CH$_3$)$_2$Si(C$_2$H$_5$)— | polymethylstyrene | —CN |

TABLE A-continued

| R | Polymer* | Y |
|---|---|---|
| (CH₃)Si(C₂H₅)₂— | polymethylstyrene | —CN |
| (C₃H₇)₃Si— | polymethylstyrene | —CN |
| φSi(CH₃)₂— | polymethylstyrene | —CN |
| (φ)₂Si(CH₃)— | polymethylstyrene | —CN |
| φ₃Si— | polymethylstyrene | —CN |
| (C₆H₁₃)₃Si— | polymethylstyrene | —CN |
| (C₈H₁₇)₃Si— | polymethylstyrene | —CN |
| H— | polyisobutylene | —OCN |
| CH₃ | polyisobutylene | —OCN |
| C₂H₅— | polyisobutylene | —OCN |
| φCH₂— | polyisobutylene | —OCN |
| CH₃φ- | polyisobutylene | —OCN |
| φ- | polyisobutylene | —OCN |
| (CH₃)₂CHφ- | polyisobutylene | —OCN |
|  | polyisobutylene | —OCN |
| φC(CH₃)₂— | polyisobutylene | —OCN |
| φC(CH₃)(C₂H₅)— | polyisobutylene | —OCN |
| φCH₂C(CH₃)₂— | polyisobutylene | —OCN |
| (CH₃)₃Si— | polyisobutylene | —OCN |
| (C₂H₅)₃Si— | polyisobutylene | —OCN |
| (CH₃)₂Si(C₂H₅)— | polyisobutylene | —OCN |
| (CH₃)Si(C₂H₅)₂— | polyisobutylene | —OCN |
| (C₃H₇)₃Si— | polyisobutylene | —OCN |
| φSi(CH₃)₂— | polyisobutylene | —OCN |
| (φ)₂Si(CH₃)— | polyisobutylene | —OCN |
| φ₃Si— | polyisobutylene | —OCN |
| (C₆H₁₃)₃Si— | polyisobutylene | —OCN |
| (C₈H₁₇)₃Si— | polyisobutylene | —OCN |
| H— | polybutylene | —OCN |
| CH₃ | polybutylene | —OCN |
| C₂H₅— | polybutylene | —OCN |
| φCH₂— | polybutylene | —OCN |
| CH₃φ- | polybutylene | —OCN |
| φ- | polybutylene | —OCN |
| (CH₃)₂CHφ- | polybutylene | —OCN |
|  | polybutylene | —OCN |
| φC(CH₃)₂— | polybutylene | —OCN |
| φC(CH₃)(C₂H₅)— | polybutylene | —OCN |
| φCH₂C(CH₃)₂— | polybutylene | —OCN |
| (CH₃)₃Si— | polybutylene | —OCN |
| (C₂H₅)₃Si— | polybutylene | —OCN |
| (CH₃)₂Si(C₂H₅)— | polybutylene | —OCN |
| (CH₃)Si(C₂H₅)₂— | polybutylene | —OCN |
| (C₃H₇)₃Si— | polybutylene | —OCN |
| φSi(CH₃)₂— | polybutylene | —OCN |
| (φ)₂Si(CH₃)— | polybutylene | —OCN |
| φ₃Si— | polybutylene | —OCN |
| (C₆H₁₃)₃Si— | polybutylene | —OCN |
| (C₈H₁₇)₃Si— | polybutylene | —OCN |
| H— | polypropylene | —OCN |
| CH₃ | polypropylene | —OCN |
| C₂H₅— | polypropylene | —OCN |
| φCH₂— | polypropylene | —OCN |
| CH₃φ- | polypropylene | —OCN |
| φ- | polypropylene | —OCN |
| (CH₃)₂CHφ- | polypropylene | —OCN |
| 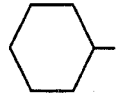 | polypropylene | —OCN |
| φC(CH₃)₂— | polypropylene | —OCN |
| φC(CH₃)(C₂H₅)— | polypropylene | —OCN |
| φCH₂C(CH₃)₂— | polypropylene | —OCN |
| (CH₃)₃Si— | polypropylene | —OCN |
| (C₂H₅)₃Si— | polypropylene | —OCN |
| (CH₃)₂Si(C₂H₅)— | polypropylene | —OCN |
| (CH₃)Si(C₂H₅)₂— | polypropylene | —OCN |
| (C₃H₇)₃Si— | polypropylene | —OCN |
| φSi(CH₃)₂— | polypropylene | —OCN |
| (φ)₂Si(CH₃)— | polypropylene | —OCN |
| φ₃Si— | polypropylene | —OCN |
| (C₆H₁₃)₃Si— | polypropylene | —OCN |
| (C₈H₁₇)₃Si— | polypropylene | —OCN |
| H— | polystyrene | —OCN |
| CH₃ | polystyrene | —OCN |
| C₂H₅— | polystyrene | —OCN |
| φCH₂— | polystyrene | —OCN |
| CH₃φ- | polystyrene | —OCN |
| φ- | polystyrene | —OCN |
| (CH₃)₂CHφ- | polystyrene | —OCN |
|  | polystyrene | —OCN |
| φC(CH₃)₂— | polystyrene | —OCN |
| φC(CH₃)(C₂H₅)— | polystyrene | —OCN |
| φCH₂C(CH₃)₂— | polystyrene | —OCN |
| (CH₃)₃Si— | polystyrene | —OCN |
| (C₂H₅)₃Si— | polystyrene | —OCN |
| (CH₃)₂Si(C₂H₅)— | polystyrene | —OCN |
| (CH₃)Si(C₂H₅)₂— | polystyrene | —OCN |
| (C₃H₇)₃Si— | polystyrene | —OCN |
| φSi(CH₃)₂— | polystyrene | —OCN |
| (φ)₂Si(CH₃)— | polystyrene | —OCN |
| φ₃Si— | polystyrene | —OCN |
| (C₆H₁₃)₃Si— | polystyrene | —OCN |
| (C₈H₁₇)₃Si— | polystyrene | —OCN |
| H— | polymethylstyrene | —OCN |
| CH₃ | polymethylstyrene | —OCN |
| C₂H₅— | polymethylstyrene | —OCN |
| φCH₂— | polymethylstyrene | —OCN |
| CH₃φ- | polymethylstyrene | —OCN |
| φ- | polymethylstyrene | —OCN |
| (CH₃)₂CHφ- | polymethylstyrene | —OCN |
|  | polymethylstyrene | —OCN |
| φC(CH₃)₂— | polymethylstyrene | —OCN |
| φC(CH₃)(C₂H₅)— | polymethylstyrene | —OCN |
| φCH₂C(CH₃)₂— | polymethylstyrene | —OCN |
| (CH₃)₃Si— | polymethylstyrene | —OCN |
| (C₂H₅)₃Si— | polymethylstyrene | —OCN |
| (CH₃)₂Si(C₂H₅)— | polymethylstyrene | —OCN |
| (CH₃)Si(C₂H₅)₂— | polymethylstyrene | —OCN |
| (C₃H₇)₃Si— | polymethylstyrene | —OCN |
| φSi(CH₃)₂— | polymethylstyrene | —OCN |
| (φ)₂Si(CH₃)— | polymethylstyrene | —OCN |
| φ₃Si— | polymethylstyrene | —OCN |
| (C₆H₁₃)₃Si— | polymethylstyrene | —OCN |
| (C₈H₁₇)₃Si— | polymethylstyrene | —OCN |
| H— | polyisobutylene | —SCN |
| CH₃ | polyisobutylene | —SCN |
| C₂H₅— | polyisobutylene | —SCN |
| φCH₂— | polyisobutylene | —SCN |
| CH₃φ- | polyisobutylene | —SCN |
| φ- | polyisobutylene | —SCN |
| (CH₃)₂CHφ- | polyisobutylene | —SCN |
|  | polyisobutylene | —SCN |

TABLE A-continued

| R | Polymer* | Y |
|---|---|---|
| φC(CH₃)₂— | polyisobutylene | —SCN |
| φC(CH₃)(C₂H₅)— | polyisobutylene | —SCN |
| φCH₂C(CH₃)₂— | polyisobutylene | —SCN |
| (CH₃)₃Si— | polyisobutylene | —SCN |
| (C₂H₅)₃Si— | polyisobutylene | —SCN |
| (CH₃)₂Si(C₂H₅)— | polyisobutylene | —SCN |
| (CH₃)Si(C₂H₅)₂— | polyisobutylene | —SCN |
| (C₃H₇)₃Si— | polyisobutylene | —SCN |
| φSi(CH₃)₂— | polyisobutylene | —SCN |
| (φ)₂Si(CH₃)— | polyisobutylene | —SCN |
| φ₃Si— | polyisobutylene | —SCN |
| (C₆H₁₃)₃Si— | polyisobutylene | —SCN |
| (C₈H₁₇)₃Si— | polyisobutylene | —SCN |
| H— | polybutylene | —SCN |
| CH₃ | polybutylene | —SCN |
| C₂H₅— | polybutylene | —SCN |
| φCH₂— | polybutylene | —SCN |
| CH₃φ- | polybutylene | —SCN |
| φ- | polybutylene | —SCN |
| (CH₃)₂CHφ- | polybutylene | —SCN |
|  | polybutylene | —SCN |
| φC(CH₃)₂— | polybutylene | —SCN |
| φC(CH₃)(C₂H₅)— | polybutylene | —SCN |
| φCH₂C(CH₃)₂— | polybutylene | —SCN |
| (CH₃)₃Si— | polybutylene | —SCN |
| (C₂H₅)₃Si— | polybutylene | —SCN |
| (CH₃)₂Si(C₂H₅)— | polybutylene | —SCN |
| (CH₃)Si(C₂H₅)₂— | polybutylene | —SCN |
| (C₃H₇)₃Si— | polybutylene | —SCN |
| φSi(CH₃)₂— | polybutylene | —SCN |
| (φ)₂Si(CH₃)— | polybutylene | —SCN |
| φ₃Si— | polybutylene | —SCN |
| (C₆H₁₃)₃Si— | polybutylene | —SCN |
| (C₈H₁₇)₃Si— | polybutylene | —SCN |
| H— | polypropylene | —SCN |
| CH₃ | polypropylene | —SCN |
| C₂H₅— | polypropylene | —SCN |
| φCH₂— | polypropylene | —SCN |
| CH₃φ- | polypropylene | —SCN |
| φ- | polypropylene | —SCN |
| (CH₃)₂CHφ- | polypropylene | —SCN |
| 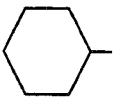 | polypropylene | —SCN |
| φC(CH₃)₂— | polypropylene | —SCN |
| φC(CH₃)(C₂H₅)— | polypropylene | —SCN |
| φCH₂C(CH₃)₂— | polypropylene | —SCN |
| (CH₃)₃Si— | polypropylene | —SCN |
| (C₂H₅)₃Si— | polypropylene | —SCN |
| (CH₃)₂Si(C₂H₅)— | polypropylene | —SCN |
| (CH₃)Si(C₂H₅)₂— | polypropylene | —SCN |
| (C₃H₇)₃Si— | polypropylene | —SCN |
| φSi(CH₃)₂— | polypropylene | —SCN |
| (φ)₂Si(CH₃)— | polypropylene | —SCN |
| φ₃Si— | polypropylene | —SCN |
| (C₆H₁₃)₃Si— | polypropylene | —SCN |
| (C₈H₁₇)₃Si— | polypropylene | —SCN |
| H— | polystyrene | —SCN |
| CH₃ | polystyrene | —SCN |
| C₂H₅— | polystyrene | —SCN |
| φCH₂— | polystyrene | —SCN |
| CH₃φ- | polystyrene | —SCN |
| φ- | polystyrene | —SCN |
| (CH₃)₂CHφ- | polystyrene | —SCN |
| 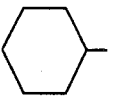 | polystyrene | —SCN |
| φC(CH₃)₂— | polystyrene | —SCN |
| φC(CH₃)(C₂H₅)— | polystyrene | —SCN |
| φCH₂C(CH₃)₂— | polystyrene | —SCN |
| (CH₃)₃Si— | polystyrene | —SCN |
| (C₂H₅)₃Si— | polystyrene | —SCN |
| (CH₃)₂Si(C₂H₅)— | polystyrene | —SCN |
| (CH₃)Si(C₂H₅)₂— | polystyrene | —SCN |
| (C₃H₇)₃Si— | polystyrene | —SCN |
| φSi(CH₃)₂— | polystyrene | —SCN |
| (φ)₂Si(CH₃)— | polystyrene | —SCN |
| φ₃Si— | polystyrene | —SCN |
| (C₆H₁₃)₃Si— | polystyrene | —SCN |
| (C₈H₁₇)₃Si— | polystyrene | —SCN |
| H— | polymethylstyrene | —SCN |
| CH₃ | polymethylstyrene | —SCN |
| C₂H₅— | polymethylstyrene | —SCN |
| φCH₂— | polymethylstyrene | —SCN |
| CH₃φ- | polymethylstyrene | —SCN |
| φ- | polymethylstyrene | —SCN |
| (CH₃)₂CHφ- | polymethylstyrene | —SCN |
| 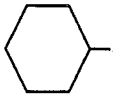 | polymethylstyrene | —SCN |
| φC(CH₃)₂— | polymethylstyrene | —SCN |
| φC(CH₃)(C₂H₅)— | polymethylstyrene | —SCN |
| φCH₂C(CH₃)₂— | polymethylstyrene | —SCN |
| (CH₃)₃Si— | polymethylstyrene | —SCN |
| (C₂H₅)₃Si— | polymethylstyrene | —SCN |
| (CH₃)₂Si(C₂H₅)— | polymethylstyrene | —SCN |
| (CH₃)Si(C₂H₅)₂— | polymethylstyrene | —SCN |
| (C₃H₇)₃Si— | polymethylstyrene | —SCN |
| φSi(CH₃)₂— | polymethylstyrene | —SCN |
| (φ)₂Si(CH₃)— | polymethylstyrene | —SCN |
| φ₃Si— | polymethylstyrene | —SCN |
| (C₆H₁₃)₃Si— | polymethylstyrene | —SCN |
| (C₈H₁₇)₃Si— | polymethylstyrene | —SCN |
| H— | polyisobutylene | —NCS |
| CH₃ | polyisobutylene | —NCS |
| C₂H₅— | polyisobutylene | —NCS |
| φCH₂— | polyisobutylene | —NCS |
| CH₃φ- | polyisobutylene | —NCS |
| φ- | polyisobutylene | —NCS |
| (CH₃)₂CHφ- | polyisobutylene | —NCS |
| 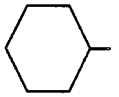 | polyisobutylene | —NCS |
| φC(CH₃)₂— | polyisobutylene | —NCS |
| φC(CH₃)(C₂H₅)— | polyisobutylene | —NCS |
| φCH₂C(CH₃)₂— | polyisobutylene | —NCS |
| (CH₃)₃Si— | polyisobutylene | —NCS |
| (C₂H₅)₃Si— | polyisobutylene | —NCS |
| (CH₃)₂Si(C₂H₅)— | polyisobutylene | —NCS |
| (CH₃)Si(C₂H₅)₂— | polyisobutylene | —NCS |
| (C₃H₇)₃Si— | polyisobutylene | —NCS |
| φSi(CH₃)₂— | polyisobutylene | —NCS |
| (φ)₂Si(CH₃)— | polyisobutylene | —NCS |
| φ₃Si— | polyisobutylene | —NCS |
| (C₆H₁₃)₃Si— | polyisobutylene | —NCS |
| (C₈H₁₇)₃Si— | polyisobutylene | —NCS |
| H— | polybutylene | —NCS |
| CH₃ | polybutylene | —NCS |
| C₂H₅— | polybutylene | —NCS |
| φCH₂— | polybutylene | —NCS |
| CH₃φ- | polybutylene | —NCS |

TABLE A-continued

| R | Polymer* | Y |
|---|---|---|
| φ- | polybutylene | —NCS |
| (CH₃)₂CHφ- | polybutylene | —NCS |
| cyclohexyl- | polybutylene | —NCS |
| φC(CH₃)₂— | polybutylene | —NCS |
| φC(CH₃)(C₂H₅)— | polybutylene | —NCS |
| φCH₂C(CH₃)₂— | polybutylene | —NCS |
| (CH₃)₃Si— | polybutylene | —NCS |
| (C₂H₅)₃Si— | polybutylene | —NCS |
| (CH₃)₂Si(C₂H₅)— | polybutylene | —NCS |
| (CH₃)Si(C₂H₅)₂— | polybutylene | —NCS |
| (C₃H₇)₃Si— | polybutylene | —NCS |
| φSi(CH₃)₂— | polybutylene | —NCS |
| (φ)₂Si(CH₃)— | polybutylene | —NCS |
| φ₃Si— | polybutylene | —NCS |
| (C₆H₁₃)₃Si— | polybutylene | —NCS |
| (C₈H₁₇)₃Si— | polybutylene | —NCS |
| H— | polypropylene | —NCS |
| CH₃ | polypropylene | —NCS |
| C₂H₅— | polypropylene | —NCS |
| φCH₂— | polypropylene | —NCS |
| CH₃φ- | polypropylene | —NCS |
| φ- | polypropylene | —NCS |
| (CH₃)₂CHφ- | polypropylene | —NCS |
| cyclohexyl- | polypropylene | —NCS |
| φC(CH₃)₂— | polypropylene | —NCS |
| φC(CH₃)(C₂H₅)— | polypropylene | —NCS |
| φCH₂C(CH₃)₂— | polypropylene | —NCS |
| (CH₃)₃Si— | polypropylene | —NCS |
| (C₂H₅)₃Si— | polypropylene | —NCS |
| (CH₃)₂Si(C₂H₅)— | polypropylene | —NCS |
| (CH₃)Si(C₂H₅)₂— | polypropylene | —NCS |
| (C₃H₇)₃Si— | polypropylene | —NCS |
| φSi(CH₃)₂— | polypropylene | —NCS |
| (φ)₂Si(CH₃)— | polypropylene | —NCS |
| φ₃Si— | polypropylene | —NCS |
| (C₆H₁₃)₃Si— | polypropylene | —NCS |
| (C₈H₁₇)₃Si— | polypropylene | —NCS |
| H— | polystyrene | —NCS |
| CH₃ | polystyrene | —NCS |
| C₂H₅— | polystyrene | —NCS |
| φCH₂— | polystyrene | —NCS |
| CH₃φ- | polystyrene | —NCS |
| φ- | polystyrene | —NCS |
| (CH₃)₂CHφ- | polystyrene | —NCS |
| cyclohexyl- | polystyrene | —NCS |
| φC(CH₃)₂— | polystyrene | —NCS |
| φC(CH₃)(C₂H₅)— | polystyrene | —NCS |
| φCH₂C(CH₃)₂— | polystyrene | —NCS |
| (CH₃)₃Si— | polystyrene | —NCS |
| (C₂H₅)₃Si— | polystyrene | —NCS |
| (CH₃)₂Si(C₂H₅)— | polystyrene | —NCS |
| (CH₃)Si(C₂H₅)₂— | polystyrene | —NCS |
| (C₃H₇)₃Si— | polystyrene | —NCS |
| φSi(CH₃)₂— | polystyrene | —NCS |
| (φ)₂Si(CH₃)— | polystyrene | —NCS |
| φ₃Si— | polystyrene | —NCS |
| (C₆H₁₃)₃Si— | polystyrene | —NCS |
| (C₈H₁₇)₃Si— | polystyrene | —NCS |
| H— | polymethylstyrene | —NCS |
| CH₃ | polymethylstyrene | —NCS |
| C₂H₅— | polymethylstyrene | —NCS |
| φCH₂— | polymethylstyrene | —NCS |
| CH₃φ- | polymethylstyrene | —NCS |
| φ- | polymethylstyrene | —NCS |
| (CH₃)₂CHφ- | polymethylstyrene | —NCS |
| cyclohexyl- | polymethylstyrene | —NCS |
| φC(CH₃)₂— | polymethylstyrene | —NCS |
| φC(CH₃)(C₂H₅)— | polymethylstyrene | —NCS |
| φCH₂C(CH₃)₂— | polymethylstyrene | —NCS |
| (CH₃)₃Si— | polymethylstyrene | —NCS |
| (C₂H₅)₃Si— | polymethylstyrene | —NCS |
| (CH₃)₂Si(C₂H₅)— | polymethylstyrene | —NCS |
| (CH₃)Si(C₂H₅)₂— | polymethylstyrene | —NCS |
| (C₃H₇)₃Si— | polymethylstyrene | —NCS |
| φSi(CH₃)₂— | polymethylstyrene | —NCS |
| (φ)₂Si(CH₃)— | polymethylstyrene | —NCS |
| φ₃Si— | polymethylstyrene | —NCS |
| (C₆H₁₃)₃Si— | polymethylstyrene | —NCS |
| (C₈H₁₇)₃Si— | polymethylstyrene | —NCS |

When a poly-functional initiator is employed, such as the bifunctional initiator of Formula III above, the polymers will comprise terminal Y-groups on each end of the polymer and a "Z" group within the polymer chain, e.g., substantially at the center of the polymer chain. Illustrative of the poly-substituted polymers of this invention therefore are those set forth in Table B below:

TABLE B

Y-[polymer*]-Z-[polyolefin]-Y

| Polyolefin | Z | Y |
|---|---|---|
| polyisobutylene | —C₃H₆— | —N₃ |
| polyisobutylene | —C₄H₈— | —N₃ |
| polyisobutylene | —C₅H₁₀— | —N₃ |
| polyisobutylene | —C₆H₁₂— | —N₃ |
| polyisobutylene | —C₈H₁₆— | —N₃ |
| polyisobutylene | —C₁₀H₂₀— | —N₃ |
| polyisobutylene | —C₁₂H₂₄— | —N₃ |
| polyisobutylene | —C₁₈H₃₆— | —N₃ |
| polyisobutylene | —C(Me)₂CH₂C(Me)₂— | —N₃ |
| polyisobutylene | —CH(Et)C₃H₆— | —N₃ |
| polyisobutylene | —C(Et)₂C₂H₄C(Et)₂— | —N₃ |
| polyisobutylene | —Si(Me)₂CH₂Si(Me)₂— | —N₃ |
| polyisobutylene | —Si(Et)(Me)C₂H₅Si(Et)(Me)— | —N₃ |
| polyisobutylene | —Si(Et)₂C₃H₆Si(Et)₂— | —N₃ |
| polyisobutylene | —φ(Et)— | —N₃ |
| polyisobutylene | —CH₂CH(φ)— | —N₃ |
| polybutylene | —C₃H₆— | —N₃ |
| polybutylene | —C₄H₈— | —N₃ |
| polybutylene | —C₅H₁₀— | —N₃ |
| polybutylene | —C₆H₁₂— | —N₃ |
| polybutylene | —C₈H₁₆— | —N₃ |
| polybutylene | —C₁₀H₂₀— | —N₃ |
| polybutylene | —C₁₂H₂₄— | —N₃ |
| polybutylene | —C₁₈H₃₆— | —N₃ |
| polybutylene | —C(Me)₂CH₂C(Me)₂— | —N₃ |
| polybutylene | —CH(Et)C₃H₆— | —N₃ |
| polybutylene | —C(Et)₂C₂H₄C(Et)₂— | —N₃ |
| polybutylene | —Si(Me)₂CH₂Si(Me)₂— | —N₃ |
| polybutylene | —Si(Et)(Me)C₂H₅Si(Et)(Me)— | —N₃ |
| polybutylene | —Si(Et)₂C₃H₆Si(Et)₂— | —N₃ |
| polybutylene | —φ(Et)— | —N₃ |
| polybutylene | —CH₂CH(φ)— | —N₃ |
| polypropylene | —C₃H₆— | —N₃ |
| polypropylene | —C₄H₈— | —N₃ |
| polypropylene | —C₅H₁₀— | —N₃ |
| polypropylene | —C₆H₁₂— | —N₃ |
| polypropylene | —C₈H₁₆— | —N₃ |

TABLE B-continued

| Polyolefin | Y-[polymer*]-Z-[polyolefin]-Y | |
|---|---|---|
| | Z | Y |
| polypropylene | —C$_{10}$H$_{20}$— | —N$_3$ |
| polypropylene | —C$_{12}$H$_{24}$— | —N$_3$ |
| polypropylene | —C$_{18}$H$_{36}$— | —N$_3$ |
| polypropylene | —C(Me)$_2$CH$_2$C(Me)$_2$— | —N$_3$ |
| polypropylene | —CH(Et)C$_3$H$_6$— | —N$_3$ |
| polypropylene | —C$_{(Et)2}$C$_2$H$_4$C(Et)$_2$— | —N$_3$ |
| polypropylene | —Si(Me)$_2$CH$_2$Si(Me)$_2$— | —N$_3$ |
| polypropylene | —Si(Et)(Me)C$_2$H$_5$Si(Et)(Me)$_2$— | —N$_3$ |
| polypropylene | —Si(Et)$_2$C$_3$H$_6$Si(Et)$_2$— | —N$_3$ |
| polypropylene | —φ(Et)— | —N$_3$ |
| polypropylene | —CH$_2$CH(φ)— | —N$_3$ |
| polystyrene | —C$_3$H$_6$— | —N$_3$ |
| polystyrene | —C$_4$H$_8$— | —N$_3$ |
| polystyrene | —C$_5$H$_{10}$— | —N$_3$ |
| polystyrene | —C$_6$H$_{12}$— | —N$_3$ |
| polystyrene | —C$_8$H$_{16}$— | —N$_3$ |
| polystyrene | —C$_{10}$H$_{20}$— | —N$_3$ |
| polystyrene | —C$_{12}$H$_{24}$— | —N$_3$ |
| polystyrene | —C$_{18}$H$_{36}$— | —N$_3$ |
| polystyrene | —C(Me)$_2$CH$_2$C(Me)$_2$— | —N$_3$ |
| polystyrene | —CH(Et)C$_3$H$_6$— | —N$_3$ |
| polystyrene | —C(Et)$_2$C$_2$H$_4$C(Et)$_2$— | —N$_3$ |
| polystyrene | —Si(Me)$_2$CH$_2$Si(Me)$_2$— | —N$_3$ |
| polystyrene | —Si(Et)(Me)C$_2$H$_5$Si(Et)(Me)— | —N$_3$ |
| polystyrene | —Si(Et)$_2$C$_3$H$_6$Si(Et)$_2$— | —N$_3$ |
| polystyrene | —φ(Et)— | —N$_3$ |
| polystyrene | —CH$_2$CH(φ)— | —N$_3$ |
| polymethylstyrene | —C$_3$H$_6$— | —N$_3$ |
| polymethylstyrene | —C$_4$H$_8$— | —N$_3$ |
| polymethylstyrene | —C$_5$H$_{10}$— | —N$_3$ |
| polymethylstyrene | —C$_6$H$_{12}$— | —N$_3$ |
| polymethylstyrene | —C$_8$H$_{16}$— | —N$_3$ |
| polymethylstyrene | —C$_{10}$H$_{20}$— | —N$_3$ |
| polymethylstyrene | —C$_{12}$H$_{24}$— | —N$_3$ |
| polymethylstyrene | —C$_{18}$H$_{36}$— | —N$_3$ |
| polymethylstyrene | —C(Me)$_2$CH$_2$C(Me)$_2$— | —N$_3$ |
| polymethylstyrene | —CH(Et)C$_3$H$_6$— | —N$_3$ |
| polymethylstyrene | —C(Et)$_2$C$_2$H$_4$C(Et)$_2$— | —N$_3$ |
| polymethylstyrene | —Si(Me)$_2$CH$_2$Si(Me)$_2$— | —N$_3$ |
| polymethylstyrene | —Si(Et)(Me)C$_2$H$_5$Si(Et)(Me)— | —N$_3$ |
| polymethylstyrene | —Si(Et)$_2$C$_3$H$_6$Si(Et)$_2$— | —N$_3$ |
| polymethylstyrene | —φ(Et)— | —N$_3$ |
| polymethylstyrene | —CH$_2$CH(φ)— | —N$_3$ |
| polyisobutylene | —C$_3$H$_6$— | —NCO |
| polyisobutylene | —C$_4$H$_8$— | —NCO |
| polyisobutylene | —C$_5$H$_{10}$— | —NCO |
| polyisobutylene | —C$_6$H$_{12}$— | —NCO |
| polyisobutylene | —C$_8$H$_{16}$— | —NCO |
| polyisobutylene | —C$_{10}$H$_{20}$— | —NCO |
| polyisobutylene | —C$_{12}$H$_{24}$— | —NCO |
| polyisobutylene | —C$_{18}$H$_{36}$— | —NCO |
| polyisobutylene | —C(Me)$_2$CH$_2$C(Me)$_2$— | —NCO |
| polyisobutylene | —CH(Et)C$_3$H$_6$— | —NCO |
| polyisobutylene | —C(Et)$_2$C$_2$H$_4$C(Et)$_2$— | —NCO |
| polyisobutylene | —Si(Me)$_2$CH$_2$Si(Me)$_2$— | —NCO |
| polyisobutylene | —Si(Et)(Me)C$_2$H$_5$Si(Et)(Me)— | —NCO |
| polyisobutylene | —Si(Et)$_2$C$_3$H$_6$Si(Et)$_2$— | —NCO |
| polyisobutylene | —φ(Et)— | —NCO |
| polyisobutylene | —CH$_2$CH(φ)— | —NCO |
| polybutylene | —C$_3$H$_6$— | —NCO |
| polybutylene | —C$_4$H$_8$— | —NCO |
| polybutylene | —C$_5$H$_{10}$— | —NCO |
| polybutylene | —C$_6$H$_{12}$— | —NCO |
| polybutylene | —C$_8$H$_{16}$— | —NCO |
| polybutylene | —C$_{10}$H$_{20}$— | —NCO |
| polybutylene | —C$_{12}$H$_{24}$— | —NCO |
| polybutylene | —C$_{18}$H$_{36}$— | —NCO |
| polybutylene | —C(Me)$_2$CH$_2$C(Me)$_2$— | —NCO |
| polybutylene | —CH(Et)C$_3$H$_6$— | —NCO |
| polybutylene | —C(Et)$_2$C$_2$H$_4$C(Et)$_2$— | —NCO |
| polybutylene | —Si(Me)$_2$CH$_2$Si(Me)$_2$— | —NCO |
| polybutylene | —Si(Et)(Me)C$_2$H$_5$Si(Et)(Me)— | —NCO |
| polybutylene | —Si(Et)$_2$C$_3$H$_6$Si(Et)$_2$— | —NCO |
| polybutylene | —φ(Et)— | —NCO |
| polybutylene | —CH$_2$CH(φ)— | —NCO |
| polypropylene | —C$_3$H$_6$— | —NCO |
| polypropylene | —C$_4$H$_8$— | —NCO |
| polypropylene | —C$_5$H$_{10}$— | —NCO |
| polypropylene | —C$_6$H$_{12}$— | —NCO |
| polypropylene | —C$_8$H$_{16}$— | —NCO |
| polypropylene | —C$_{10}$H$_{20}$— | —NCO |
| polypropylene | —C$_{12}$H$_{24}$— | —NCO |
| polypropylene | —C$_{18}$H$_{36}$— | —NCO |
| polypropylene | —C(Me)$_2$CH$_2$C(Me)$_2$— | —NCO |
| polypropylene | —CH(Et)C$_3$H$_6$— | —NCO |
| polypropylene | —C(Et)$_2$C$_2$H$_4$C(Et)$_2$— | —NCO |
| polypropylene | —Si(Me)$_2$CH$_2$Si(Me)$_2$— | —NCO |
| polypropylene | —Si(Et)(Me)C$_2$H$_5$Si(Et)(Me)— | —NCO |
| polypropylene | —Si(Et)$_2$C$_3$H$_6$Si(Et)$_2$— | —NCO |
| polypropylene | —φ(Et)— | —NCO |
| polypropylene | —CH$_2$CH(φ)— | —NCO |
| polystyrene | —C$_3$H$_6$— | —NCO |
| polystyrene | —C$_4$H$_8$— | —NCO |
| polystyrene | —C$_5$H$_{10}$— | —NCO |
| polystyrene | —C$_6$H$_{12}$— | —NCO |
| polystyrene | —C$_8$H$_{16}$— | —NCO |
| polystyrene | —C$_{10}$H$_{20}$— | —NCO |
| polystyrene | —C$_{12}$H$_{24}$— | —NCO |
| polystyrene | —C$_{18}$H$_{36}$— | —NCO |
| polystyrene | —C(Me)$_2$CH$_2$C(Me)$_2$— | —NCO |
| polystyrene | —CH(Et)C$_3$H$_6$— | —NCO |
| polystyrene | —C(Et)$_2$C$_2$H$_4$C(Et)$_2$— | —NCO |
| polystyrene | —Si(Me)$_2$CH$_2$Si(Me)$_2$— | —NCO |
| polystyrene | —Si(Et)(Me)C$_2$H$_5$Si(Et)(Me)— | —NCO |
| polystyrene | —Si(Et)$_2$C$_3$H$_6$Si(Et)$_2$— | —NCO |
| polystyrene | —φ(Et)— | —NCO |
| polystyrene | —CH$_2$CH(φ)— | —NCO |
| polymethylstyrene | —C$_3$H$_6$— | —NCO |
| polymethylstyrene | —C$_4$H$_8$— | —NCO |
| polymethylstyrene | —C$_5$H$_{10}$— | —NCO |
| polymethylstyrene | —C$_6$H$_{12}$— | —NCO |
| polymethylstyrene | —C$_8$H$_{16}$— | —NCO |
| polymethylstyrene | —C$_{10}$H$_{20}$— | —NCO |
| polymethylstyrene | —C$_{12}$H$_{24}$— | —NCO |
| polymethylstyrene | —C$_{18}$H$_{36}$— | —NCO |
| polymethylstyrene | —C(Me)$_2$CH$_2$C(Me)$_2$— | —NCO |
| polymethylstyrene | —CH(Et)C$_3$H$_6$— | —NCO |
| polymethylstyrene | —C(Et)$_2$C$_2$H$_4$C(Et)$_2$— | —NCO |
| polymethylstyrene | —Si(Me)$_2$CH$_2$Si(Me)$_2$— | —NCO |
| polymethylstyrene | —Si(Et)(Me)C$_2$H$_5$Si(Et)(Me)— | —NCO |
| polymethylstyrene | —Si(Et)$_2$C$_3$H$_6$Si(Et)$_2$— | —NCO |
| polymethylstyrene | —φ(Et)— | —NCO |
| polymethylstyrene | —CH$_2$CH(φ)— | —NCO |
| polyisobutylene | —C$_3$H$_6$— | —NCS |
| polyisobutylene | —C$_4$H$_8$— | —NCS |
| polyisobutylene | —C$_5$H$_{10}$— | —NCS |
| polyisobutylene | —C$_6$H$_{12}$— | —NCS |
| polyisobutylene | —C$_8$H$_{16}$— | —NCS |
| polyisobutylene | —C$_{10}$H$_{20}$— | —NCS |
| polyisobutylene | —C$_{12}$H$_{24}$— | —NCS |
| polyisobutylene | —C$_{18}$H$_{36}$— | —NCS |
| polyisobutylene | —C(Me)$_2$CH$_2$C(Me)$_2$— | —NCS |
| polyisobutylene | —CH(Et)C$_3$H$_6$— | —NCS |
| polyisobutylene | —C(Et)$_2$C$_2$H$_4$C(Et)$_2$— | —NCS |
| polyisobutylene | —Si(Me)$_2$CH$_2$Si(Me)$_2$— | —NCS |
| polyisobutylene | —Si(Et)(Me)C$_2$H$_5$Si(Et)(Me)— | —NCS |
| polyisobutylene | —Si(Et)$_2$C$_3$H$_6$Si(Et)$_2$— | —NCS |
| polyisobutylene | —φ(Et)— | —NCS |
| polyisobutylene | —CH$_2$CH(φ)— | —NCS |
| polybutylene | —C$_3$H$_6$— | —NCS |
| polybutylene | —C$_4$H$_8$— | —NCS |
| polybutylene | —C$_5$H$_{10}$— | —NCS |
| polybutylene | —C$_6$H$_{12}$— | —NCS |
| polybutylene | —C$_8$H$_{16}$— | —NCS |
| polybutylene | —C$_{10}$H$_{20}$— | —NCS |
| polybutylene | —C$_{12}$H$_{24}$— | —NCS |
| polybutylene | —C$_{18}$H$_{36}$— | —NCS |
| polybutylene | —C(Me)$_2$CH$_2$C(Me)$_2$— | —NCS |
| polybutylene | —CH(Et)C$_3$H$_6$— | —NCS |
| polybutylene | —C(Et)$_2$C$_2$H$_4$C(Et)$_2$— | —NCS |
| polybutylene | —Si(Me)$_2$CH$_2$Si(Me)$_2$— | —NCS |
| polybutylene | —Si(Et)(Me)C$_2$H$_5$Si(Et)(Me)— | —NCS |
| polybutylene | —Si(Et)$_2$C$_3$H$_6$Si(Et)$_2$— | —NCS |
| polybutylene | —φ(Et)— | —NCS |
| polybutylene | —CH$_2$CH(φ)— | —NCS |
| polypropylene | —C$_3$H$_6$— | —NCS |
| polypropylene | —C$_4$H$_8$— | —NCS |
| polypropylene | —C$_5$H$_{10}$— | —NCS |

TABLE B-continued

Y-[polymer*]-Z-[polyolefin]-Y

| Polyolefin | Z | Y |
|---|---|---|
| polypropylene | —$C_6H_{12}$— | —NCS |
| polypropylene | —$C_8H_{16}$— | —NCS |
| polypropylene | —$C_{10}H_{20}$— | —NCS |
| polypropylene | —$C_{12}H_{24}$— | —NCS |
| polypropylene | —$C_{18}H_{36}$— | —NCS |
| polypropylene | —$C(Me)_2CH_2C(Me)_2$— | —NCS |
| polypropylene | —$CH(Et)C_3H_6$— | —NCS |
| polypropylene | —$C(Et)_2C_2H_4C(Et)_2$— | —NCS |
| polypropylene | —$Si(Me)_2CH_2Si(Me)_2$— | —NCS |
| polypropylene | —$Si(Et)(Me)C_2H_5Si(Et)(Me)$— | —NCS |
| polypropylene | —$Si(Et)_2C_3H_6Si(Et)_2$— | —NCS |
| polypropylene | —$\phi(Et)$— | —NCS |
| polypropylene | —$CH_2CH(\phi)$— | —NCS |
| polystyrene | —$C_3H_6$— | —NCS |
| polystyrene | —$C_4H_8$— | —NCS |
| polystyrene | —$C_5H_{10}$— | —NCS |
| polystyrene | —$C_6H_{12}$— | —NCS |
| polystyrene | —$C_8H_{16}$— | —NCS |
| polystyrene | —$C_{10}H_{20}$— | —NCS |
| polystyrene | —$C_{12}H_{24}$— | —NCS |
| polystyrene | —$C_{18}H_{36}$— | —NCS |
| polystyrene | —$C(Me)_2CH_2C(Me)_2$— | —NCS |
| polystyrene | —$CH(Et)C_3H_6$— | —NCS |
| polystyrene | —$C(Et)_2C_2H_4C(Et)_2$— | —NCS |
| polystyrene | —$Si(Me)_2CH_2Si(Me)_2$— | —NCS |
| polystyrene | —$Si(Et)(Me)C_2H_5Si(Et)(Me)$— | —NCS |
| polystyrene | —$Si(Et)_2C_3H_6Si(Et)_2$— | —NCS |
| polystyrene | —$\phi(Et)$— | —NCS |
| polystyrene | —$CH_2CH(\phi)$— | —NCS |
| polymethylstyrene | —$C_3H_6$— | —NCS |
| polymethylstyrene | —$C_4H_8$— | —NCS |
| polymethylstyrene | —$C_5H_{10}$— | —NCS |
| polymethylstyrene | —$C_6H_{12}$— | —NCS |
| polymethylstyrene | —$C_8H_{16}$— | —NCS |
| polymethylstyrene | —$C_{10}H_{20}$— | —NCS |
| polymethylstyrene | —$C_{12}H_{24}$— | —NCS |
| polymethylstyrene | —$C_{18}H_{36}$— | —NCS |
| polymethylstyrene | —$C(Me)_2CH_2C(Me)_2$— | —NCS |
| polymethylstyrene | —$CH(Et)C_3H_6$— | —NCS |
| polymethylstyrene | —$C(Et)_2C_2H_4C(Et)_2$— | —NCS |
| polymethylstyrene | —$Si(Me)_2CH_2Si(Me)_2$— | —NCS |
| polymethylstyrene | —$Si(Et)(Me)C_2H_5Si(Et)(Me)$— | —NCS |
| polymethylstyrene | —$Si(Et)_2C_3H_6Si(Et)_2$— | —NCS |
| polymethylstyrene | —$\phi(Et)$— | —NCS |
| polymethylstyrene | —$CH_2CH(\phi)$— | —NCS |
| polyisobutylene | —$C_3H_6$— | —OCN |
| polyisobutylene | —$C_4H_8$— | —OCN |
| polyisobutylene | —$C_5H_{10}$— | —OCN |
| polyisobutylene | —$C_6H_{12}$— | —OCN |
| polyisobutylene | —$C_8H_{16}$— | —OCN |
| polyisobutylene | —$C_{10}H_{20}$— | —OCN |
| polyisobutylene | —$C_{12}H_{24}$— | —OCN |
| polyisobutylene | —$C_{18}H_{36}$— | —OCN |
| polyisobutylene | —$C(Me)_2CH_2C(Me)_2$— | —OCN |
| polyisobutylene | —$CH(Et)C_3H_6$— | —OCN |
| polyisobutylene | —$C(Et)_2C_2H_4C(Et)_2$— | —OCN |
| polyisobutylene | —$Si(Me)_2CH_2Si(Me)$— | —OCN |
| polyisobutylene | —$Si(Et)(Me)C_2H_5Si(Et)(Me)$— | —OCN |
| polyisobutylene | —$Si(Et)_2C_3H_6Si(Et)_2$— | —OCN |
| polyisobutylene | —$\phi(Et)$— | —OCN |
| polyisobutylene | —$CH_2CH(\phi)$— | —OCN |
| polybutylene | —$C_3H_6$— | —OCN |
| polybutylene | —$C_4H_8$— | —OCN |
| polybutylene | —$C_5H_{10}$— | —OCN |
| polybutylene | —$C_6H_{12}$— | —OCN |
| polybutylene | —$C_8H_{16}$— | —OCN |
| polybutylene | —$C_{10}H_{20}$— | —OCN |
| polybutylene | —$C_{12}H_{24}$— | —OCN |
| polybutylene | —$C_{18}H_{36}$— | —OCN |
| polybutylene | —$C(Me)_2CH_2C(Me)_2$— | —OCN |
| polybutylene | —$CH(Et)C_3H_6$— | —OCN |
| polybutylene | —$C(Et)_2C_2H_4C(Et)_2$— | —OCN |
| polybutylene | —$Si(Me)_2CH_2Si(Me)_2$— | —OCN |
| polybutylene | —$Si(Et)(Me)C_2H_5Si(Et)(Me)$— | —OCN |
| polybutylene | —$Si(Et)_2C_3H_6Si(Et)_2$— | —OCN |
| polybutylene | —$\phi(Et)$— | —OCN |
| polybutylene | —$CH_2CH(\phi)$— | —OCN |
| polypropylene | —$C_3H_6$— | —OCN |
| polypropylene | —$C_4H_8$— | —OCN |
| polypropylene | —$C_5H_{10}$— | —OCN |
| polypropylene | —$C_6H_{12}$— | —OCN |
| polypropylene | —$C_8H_{16}$— | —OCN |
| polypropylene | —$C_{10}H_{20}$— | —OCN |
| polypropylene | —$C_{12}H_{24}$— | —OCN |
| polypropylene | —$C_{18}H_{36}$— | —OCN |
| polypropylene | —$C(Me)_2CH_2C(Me)_2$— | —OCN |
| polypropylene | —$CH(Et)C_3H_6$— | —OCN |
| polypropylene | —$C(Et)_2C_2H_4C(Et)_2$— | —OCN |
| polypropylene | —$Si(Me)_2CH_2Si(Me)_2$— | —OCN |
| polypropylene | —$Si(Et)(Me)C_2H_5Si(Et)(Me)$— | —OCN |
| polypropylene | —$Si(Et)_2C_3H_6Si(Et)_2$— | —OCN |
| polypropylene | —$\phi(Et)$— | —OCN |
| polypropylene | —$CH_2CH(\phi)$— | —OCN |
| polystyrene | —$C_3H_6$— | —OCN |
| polystyrene | —$C_4H_8$— | —OCN |
| polystyrene | —$C_5H_{10}$— | —OCN |
| polystyrene | —$C_6H_{12}$— | —OCN |
| polystyrene | —$C_8H_{16}$— | —OCN |
| polystyrene | —$C_{10}H_{20}$— | —OCN |
| polystyrene | —$C_{12}H_{24}$— | —OCN |
| polystyrene | —$C_{18}H_{36}$— | —OCN |
| polystyrene | —$C(Me)_2CH_2C(Me)_2$— | —OCN |
| polystyrene | —$CH(Et)C_3H_6$— | —OCN |
| polystyrene | —$C(Et)_2C_2H_4C(Et)_2$— | —OCN |
| polystyrene | —$Si(Me)_2CH_2Si(Me)_2$— | —OCN |
| polystyrene | —$Si(Et)(Me)C_2H_5Si(Et)(Me)$— | —OCN |
| polystyrene | —$Si(Et)_2C_3H_6Si(Et)_2$— | —OCN |
| polystyrene | —$\phi(Et)$— | —OCN |
| polystyrene | —$CH_2CH(\phi)$— | —OCN |
| polymethylstyrene | —$C_3H_6$— | —OCN |
| polymethylstyrene | —$C_4H_8$— | —OCN |
| polymethylstyrene | —$C_5H_{10}$— | —OCN |
| polymethylstyrene | —$C_6H_{12}$— | —OCN |
| polymethylstyrene | —$C_8H_{16}$— | —OCN |
| polymethylstyrene | —$C_{10}H_{20}$— | —OCN |
| polymethylstyrene | —$C_{12}H_{24}$— | —OCN |
| polymethylstyrene | —$C_{18}H_{36}$— | —OCN |
| polymethylstyrene | —$C(Me)_2CH_2C(Me)_2$— | —OCN |
| polymethylstyrene | —$CH(Et)C_3H_6$— | —OCN |
| polymethylstyrene | —$C(Et)_2C_2H_4C(Et)_2$— | —OCN |
| polymethylstyrene | —$Si(Me)_2CH_2Si(Me)_2$— | —OCN |
| polymethylstyrene | —$Si(Et)(Me)C_2H_5Si(Et)(Me)$— | —OCN |
| polymethylstyrene | —$Si(Et)_2C_3H_6Si(Et)_2$— | —OCN |
| polymethylstyrene | —$\phi(Et)$— | —OCN |
| polymethylstyrene | —$CH_2CH(\phi)$— | —OCN |
| polyisobutylene | —$C_3H_6$— | —SCN |
| polyisobutylene | —$C_4H_8$— | —SCN |
| polyisobutylene | —$C_5H_{10}$— | —SCN |
| polyisobutylene | —$C_6H_{12}$— | —SCN |
| polyisobutylene | —$C_8H_{16}$— | —SCN |
| polyisobutylene | —$C_{10}H_{20}$— | —SCN |
| polyisobutylene | —$C_{12}H_{24}$— | —SCN |
| polyisobutylene | —$C_{18}H_{36}$— | —SCN |
| polyisobutylene | —$C(Me)_2CH_2C(Me)_2$— | —SCN |
| polyisobutylene | —$CH(Et)C_3H_6$— | —SCN |
| polyisobutylene | —$C(Et)_2C_2H_4C(Et)_2$— | —SCN |
| polyisobutylene | —$Si(Me)_2CH_2Si(Me)_2$— | —SCN |
| polyisobutylene | —$Si(Et)(Me)C_2H_5Si(Et)(Me)$— | —SCN |
| polyisobutylene | —$Si(Et)_2C_3H_6Si(Et)_2$— | —SCN |
| polyisobutylene | —$\phi(Et)$— | —SCN |
| polyisobutylene | —$CH_2CH(\phi)$— | —SCN |
| polybutylene | —$C_3H_6$— | —SCN |
| polybutylene | —$C_4H_8$— | —SCN |
| polybutylene | —$C_5H_{10}$— | —SCN |
| polybutylene | —$C_6H_{12}$— | —SCN |
| polybutylene | —$C_8H_{16}$— | —SCN |
| polybutylene | —$C_{10}H_{20}$— | —SCN |
| polybutylene | —$C_{12}H_{24}$— | —SCN |
| polybutylene | —$C_{18}H_{36}$— | —SCN |
| polybutylene | —$C(Me)_2CH_2C(Me)_2$— | —SCN |
| polybutylene | —$CH(Et)C_3H_6$— | —SCN |
| polybutylene | —$C(Et)_2C_2H_4C(Et)_2$— | —SCN |
| polybutylene | —$Si(Me)_2CH_2Si(Me)_2$— | —SCN |
| polybutylene | —$Si(Et)(Me)C_2H_5Si(Et)(Me)$— | —SCN |
| polybutylene | —$Si(Et)_2C_3H_6Si(Et)_2$— | —SCN |
| polybutylene | —$\phi(Et)$— | —SCN |
| polybutylene | —$CH_2CH(\phi)$— | —SCN |
| polypropylene | —$C_3H_6$— | —SCN |

TABLE B-continued

Y-[polymer*]-Z-[polyolefin]-Y

| Polyolefin | Z | Y |
|---|---|---|
| polypropylene | —C$_4$H$_8$— | —SCN |
| polypropylene | —C$_5$H$_{10}$— | —SCN |
| polypropylene | —C$_6$H$_{12}$— | —SCN |
| polypropylene | —C$_8$H$_{16}$— | —SCN |
| polypropylene | —C$_{10}$H$_{20}$— | —SCN |
| polypropylene | —C$_{12}$H$_{24}$— | —SCN |
| polypropylene | —C$_{18}$H$_{36}$— | —SCN |
| polypropylene | —C(Me)$_2$CH$_2$C(Me)$_2$— | —SCN |
| polypropylene | —CH(Et)C$_3$H$_6$— | —SCN |
| polypropylene | —C(Et)$_2$C$_2$H$_4$C(Et)$_2$— | —SCN |
| polypropylene | —Si(Me)$_2$CH$_2$Si(Me)$_2$— | —SCN |
| polypropylene | —Si(Et)(Me)C$_2$H$_5$Si(Et)(Me)— | —SCN |
| polypropylene | —Si(Et)$_2$C$_3$H$_6$Si(Et)$_2$— | —SCN |
| polypropylene | —φ(Et)— | —SCN |
| polypropylene | —CH$_2$CH(φ)— | —SCN |
| polystyrene | —C$_3$H$_6$— | —SCN |
| polystyrene | —C$_4$H$_8$— | —SCN |
| polystyrene | —C$_5$H$_{10}$— | —SCN |
| polystyrene | —C$_6$H$_{12}$— | —SCN |
| polystyrene | —C$_8$H$_{16}$— | —SCN |
| polystyrene | —C$_{10}$H$_{20}$— | —SCN |
| polystyrene | —C$_{12}$H$_{24}$— | —SCN |
| polystyrene | —C$_{18}$H$_{36}$— | —SCN |
| polystyrene | —C(Me)$_2$CH$_2$C(Me)$_2$— | —SCN |
| polystyrene | —CH(Et)C$_3$H$_6$— | —SCN |
| polystyrene | —C(Et)$_2$C$_2$H$_4$C(Et)$_2$— | —SCN |
| polystyrene | —Si(Me)$_2$CH$_2$Si(Me)$_2$— | —SCN |
| polystyrene | —Si(Et)(Me)C$_2$H$_5$Si(Et)(Me)— | —SCN |
| polystyrene | —Si(Et)$_2$C$_3$H$_6$Si(Et)$_2$— | —SCN |
| polystyrene | —φ(Et)— | —SCN |
| polystyrene | —CH$_2$CH(φ)— | —SCN |
| polymethylstyrene | —C$_3$H$_6$— | —SCN |
| polymethylstyrene | —C$_4$H$_8$— | —SCN |
| polymethylstyrene | —C$_5$H$_{10}$— | —SCN |
| polymethylstyrene | —C$_6$H$_{12}$— | —SCN |
| polymethylstyrene | —C$_8$H$_{16}$— | —SCN |
| polymethylstyrene | —C$_{10}$H$_{20}$— | —SCN |
| polymethylstyrene | —C$_{12}$H$_{24}$— | —SCN |
| polymethylstyrene | —C$_{18}$H$_{36}$— | —SCN |
| polymethylstyrene | —C(Me)$_2$CH$_2$C(Me)$_2$— | —SCN |
| polymethylstyrene | —CH(Et)C$_3$H$_6$— | —SCN |
| polymethylstyrene | —C(Et)$_2$C$_2$H$_4$C(Et)$_2$— | —SCN |
| polymethylstyrene | —Si(Me)$_2$CH$_2$Si(Me)$_2$— | —SCN |
| polymethylstyrene | —Si(Et)(Me)C$_2$H$_5$Si(Et)(Me)— | —SCN |
| polymethylstyrene | —Si(Et)$_2$C$_3$H$_6$Si(Et)$_2$— | —SCN |
| polymethylstyrene | —φ(Et)— | —SCN |
| polymethylstyrene | —CH$_2$CH(φ)— | —SCN |
| polyisobutylene | —C$_3$H$_6$— | —NCS |
| polyisobutylene | —C$_4$H$_8$— | —NCS |
| polyisobutylene | —C$_5$H$_{10}$— | —NCS |
| polyisobutylene | —C$_6$H$_{12}$— | —NCS |
| polyisobutylene | —C$_8$H$_{16}$— | —NCS |
| polyisobutylene | —C$_{10}$H$_{20}$— | —NCS |
| polyisobutylene | —C$_{12}$H$_{24}$— | —NCS |
| polyisobutylene | —C$_{18}$H$_{36}$— | —NCS |
| polyisobutylene | —C(Me)$_2$CH$_2$C(Me)$_2$— | —NCS |
| polyisobutylene | —CH(Et)C$_3$H$_6$— | —NCS |
| polyisobutylene | —C(Et)$_2$C$_2$H$_4$C(Et)$_2$— | —NCS |
| polyisobutylene | —Si(Me)$_2$CH$_2$Si(Me)$_2$— | —NCS |
| polyisobutylene | —Si(Et)(Me)C$_2$H$_5$Si(Et)(Me)— | —NCS |
| polyisobutylene | —Si(Et)$_2$C$_3$H$_6$Si(Et)$_2$— | —NCS |
| polyisobutylene | —φ(Et)— | —NCS |
| polyisobutylene | —CH$_2$CH(φ)— | —NCS |
| polybutylene | —C$_3$H$_6$— | —NCS |
| polybutylene | —C$_4$H$_8$— | —NCS |
| polybutylene | —C$_5$H$_{10}$— | —NCS |
| polybutylene | —C$_6$H$_{12}$— | —NCS |
| polybutylene | —C$_8$H$_{16}$— | —NCS |
| polybutylene | —C$_{10}$H$_{20}$— | —NCS |
| polybutylene | —C$_{12}$H$_{24}$— | —NCS |
| polybutylene | —C$_{18}$H$_{36}$— | —NCS |
| polybutylene | —C(Me)$_2$CH$_2$C(Me)$_2$— | —NCS |
| polybutylene | —CH(Et)C$_3$H$_6$— | —NCS |
| polybutylene | —C(Et)$_2$C$_2$H$_4$C(Et)$_2$— | —NCS |
| polybutylene | —Si(Me)$_2$CH$_2$Si(Me)$_2$— | —NCS |
| polybutylene | —Si(Et)(Me)C$_2$H$_5$Si(Et)(Me)— | —NCS |
| polybutylene | —Si(Et)$_2$C$_3$H$_6$Si(Et)$_2$— | —NCS |
| polybutylene | —φ(Et)— | —NCS |
| polybutylene | —CH$_2$CH(φ)— | —NCS |
| polypropylene | —C$_3$H$_6$— | —NCS |
| polypropylene | —C$_4$H$_8$— | —NCS |
| polypropylene | —C$_5$H$_{10}$— | —NCS |
| polypropylene | —C$_6$H$_{12}$— | —NCS |
| polypropylene | —C$_8$H$_{16}$— | —NCS |
| polypropylene | —C$_{10}$H$_{20}$— | —NCS |
| polypropylene | —C$_{12}$H$_{24}$— | —NCS |
| polypropylene | —C$_{18}$H$_{36}$— | —NCS |
| polypropylene | —C(Me)$_2$CH$_2$C(Me)$_2$— | —NCS |
| polypropylene | —CH(Et)C$_3$H$_6$— | —NCS |
| polypropylene | —C(Et)$_2$C$_2$H$_4$C(Et)$_2$— | —NCS |
| polypropylene | —Si(Me)$_2$CH$_2$Si(Me)$_2$— | —NCS |
| polypropylene | —Si(Et)(Me)C$_2$H$_5$Si(Et)(Me)— | —NCS |
| polypropylene | —Si(Et)$_2$C$_3$H$_6$Si(Et)$_2$— | —NCS |
| polypropylene | —φ(Et)— | —NCS |
| polypropylene | —CH$_2$CH(φ)— | —NCS |
| polystyrene | —C$_3$H$_6$— | —NCS |
| polystyrene | —C$_4$H$_8$— | —NCS |
| polystyrene | —C$_5$H$_{10}$— | —NCS |
| polystyrene | —C$_6$H$_{12}$— | —NCS |
| polystyrene | —C$_8$H$_{16}$— | —NCS |
| polystyrene | —C$_{10}$H$_{20}$— | —NCS |
| polystyrene | —C$_{12}$H$_{24}$— | —NCS |
| polystyrene | —C$_{18}$H$_{36}$— | —NCS |
| polystyrene | —C(Me)$_2$CH$_2$C(Me)$_2$— | —NCS |
| polystyrene | —CH(Et)C$_3$H$_6$— | —NCS |
| polystyrene | —C(Et)$_2$C$_2$H$_4$C(Et)$_2$— | —NCS |
| polystyrene | —Si(Me)$_2$CH$_2$Si(Me)$_2$— | —NCS |
| polystyrene | —Si(Et)(Me)C$_2$H$_5$Si(Et)(Me)— | —NCS |
| polystyrene | —Si(Et)$_2$C$_3$H$_6$Si(Et)$_2$— | —NCS |
| polystyrene | —φ(Et)— | —NCS |
| polystyrene | —CH$_2$CH(φ)— | —NCS |
| polymethylstyrene | —C$_3$H$_6$— | —NCS |
| polymethylstyrene | —C$_4$H$_8$— | —NCS |
| polymethylstyrene | —C$_5$H$_{10}$— | —NCS |
| polymethylstyrene | —C$_6$H$_{12}$— | —NCS |
| polymethylstyrene | —C$_8$H$_{16}$— | —NCS |
| polymethylstyrene | —C$_{10}$H$_{20}$— | —NCS |
| polymethylstyrene | —C$_{12}$H$_{24}$— | —NCS |
| polymethylstyrene | —C$_{18}$H$_{36}$— | —NCS |
| polymethylstyrene | —C(Me)$_2$CH$_2$C(Me)$_2$— | —NCS |
| polymethylstyrene | —CH(Et)C$_3$H$_6$— | —NCS |
| polymethylstyrene | —C(Et)$_2$C$_2$H$_4$C(Et)$_2$— | —NCS |
| polymethylstyrene | —Si(Me)$_2$CH$_2$Si(Me)$_2$— | —NCS |
| polymethylstyrene | —Si(Et)(Me)C$_2$H$_5$Si(Et)(Me)— | —NCS |
| polymethylstyrene | —Si(Et)$_2$C$_3$H$_6$Si(Et)$_2$— | —NCS |
| polymethylstyrene | —φ(Et)— | —NCS |
| polymethylstyrene | —CH$_2$CH(φ)— | —NCS |

The polymers of the present invention are useful by incorporation and dissolution into an oleaginous material such as fuels and lubricating oils. When the polymers of this invention are used in normally liquid petroleum fuels such as middle distillates boiling from about 65° to 430° C., including kerosene, diesel fuels, home heating fuel oil, jet fuels, etc., a concentration of the polymers in the fuel in the range of typically from about 0.001 to about 0.5, and preferably 0.005 to about 0.15 weight percent, based on the total weight of the composition, will usually be employed. When the polymers of this invention are used in lubricating oils, a concentration of the polymers in the lubricating oil in the range of from about 0.01 to 15 weight percent, and preferably 0.5 to about 10 weight percent, based on the total weight of the lubricating composition, will usually be employed. The polymers may be employed in lubricating oil compositions which employ a base oil in which the polymers are dissolved or dispersed. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the polymers of the present invention in base oils conventionally employed in and-/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the polymers of the present invention. These lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, friction modifiers, etc.

The polymers of this invention are also useful as polymerization additives, e.g. as cross-linking agents and polymerization comonomers, and the polymers can be employed to prepare molded or extruded articles such as films.

The following examples illustrate the invention. The examples were conducted in a batch polymerization employing a cooled reactor dipped in an external cold bath.

EXAMPLE 1

Cocatalysis Of The Isobutylene Polymerization By Hydrazoic Acid

A typical polymerization procedure is given below. 20 ml (0.225 mole) of isobutylene at $-10°$ C. are dissolved into 200 ml of methylene chloride. Then 9 ml of a solution 1 molar in $HN_3$ (dissolved in methylene chloride) are added and the reaction medium is brought to a temperature of $-70°$ C. Then titanium tetrachloride at a concentration of about 0.05M is introduced so as to obtain polymerization. After 50 minutes, the medium is quenched with 10 mls. of a mixture containing 90 wt% methanol and 10 wt% of an aqueous ammonia solution (33 wt. % ammonia). The polymer is recovered by extraction with petroleum ether, filtration and drying under vacuum. The molecular weight is determined by vapor pressure osmometry and the azide content is determined by spectroscopic methods.

The results of a series of experiments of isobutylene polymerizations cocatalyzed by hydrazoic acid are reported in Table I. For all these experiments, the initial monomer concentration is equal to 1.22 mole/liter, the initial titanium tetrachloride concentration is equal to $5.6 \cdot 10^{-2}$ mole/liter.

One can see from this Table that the molecular weight of the polymer increases with decreasing temperature (see runs 1-2, 1-3 and 1-4), and the functionalization increases when the temperature is decreased. Best results are obtained when the mole ratio of cocatalyst to catalyst approaches 1:1.

TABLE I

| | COCATALYSIS BY HYDRAZOIC ACID | | | | | | |
|---|---|---|---|---|---|---|---|
| | Mole | | | | Polymer Product | | |
| Run No. | Ratio Catalyst[1] | Temp. (°C.) | t (min)[2] | Wt. % yield[3] | [Azide][4] | $\overline{M}_n$[5] | $f_{N_3}$[6] |
| 1-1 | 1.5 | −70 | 50 | 80 | 1.5 | 2500 | 0.4 |
| 1-2 | 1.2 | −30 | 10 | 84 | 0.9 | 1200 | 0.1 |
| 1-3 | 1.2 | −50 | 10 | 92 | 1.8 | 2100 | 0.4 |
| 1-4 | 1.2 | −70 | 25 | 25 | 1.3 | 3600 | 0.5 |
| 1-5 | 1.1 | −70 | 25 | 80 | 2.8 | 2300 | 0.7 |
| 1-6 | 0.75 | −70 | 30 | 75 | 2.0 | 2600 | 0.6 |
| 1-7 | 0.75 | −70 | 30 | 90 | 2.0 | 2500 | 0.6 |
| 1-8 | 0.5 | −70 | 30 | 100 | 1.3 | 3000 | 0.4 |

TABLE I-continued

NOTES:
[1] Mole ratio (charged) $HN_3/TiCl_4$.
[2] Polymerization time, determined from the introduction of the $TiCl_4$ catalyst until quenched.
[3] Calculated as the wt. % ratio of collected polymer to initial isobutylene charged.
[4] Moles of azide functional groups incorporated into polymer per gram of polymer product.
[5] Number average molecular weight.
[6] Degree of azide functionalization (azide functional groups per polymer chain).

EXAMPLE 2

Functionalization Of Polyisobutylene ("PIB") By Polymerization Initiated By $TiCl_4$ In The Presence Of 2-Azido-2-phenyl Propane ("APP")

We report below the typical procedure for Run No. 2-2, Table II, for which the initiator/catalyst molar ratio corresponds to stoichiometry. For the other experiments, the initiator concentrations is adjusted so as to give the required molar ratio, keeping constant the $TiCl_4$ concentration. In a dry reaction vessel under vacuum, 200 ml of dichloromethane are introduced, followed by 1 ml of titanium tetrachloride and 1.47 g. (9.1 mmole) of 2-azido-2-phenyl propane. After the reaction medium reaches a temperature of $-60°$ C., 20 ml of liquid isobutylene are introduced by vacuum distillation and the reaction is allowed to proceed for 30 minutes. Polymer recovery is done according to the same procedure as in the Example 1. Some results are shown in Table II.

The results reported on Table II allow the following comments: the highest functionality is obtained for a molar ratio of APP/$TiCl_4$ approximately equal to one. Lowering the temperature apparently improves the functionality (compare runs 2-2 and 2-4).

NMR spectroscopy of the oligoisobutylenes obtained by polymerization in the presence of 2-azido2-phenyl-propane has shown the presence on the proton resonance spectrum of a group of resonance at 7.3 ppm corresponding to aromatic nuclei. The resonance pattern at 7.3 ppm is characteristic of a monosubstituted aromatic nucleus. This finding is in agreement with the initiation starting from 2-azido-2-phenyl propane molecule, and also indicates that there is no alkylation reaction during polymerization.

TABLE II

| ISOBUTYLENE POLYMERIZATIONS IN THE PRESENCE OF 2-AZIDO 2-PHENYL PROPANE (APP) | | | | | |
|---|---|---|---|---|---|
| | | | Polymer Product | | |
| Run No. | Mole Ratio* | Temp. (°C.) | Wt. % yield | $\overline{M}_n$ | $f_{N_3}$ |
| 2-1 | 0.5 | −60 | 100 | 3500 | 0.1 |
| 2-2 | 1.0 | −60 | 80 | 2200 | 0.6 |
| 2-3** | 1.5 | −60 | 90 | 3000 | 0.5 |
| 2-4 | 1.0 | −50 | 90 | 2200 | 0.3 |
| 2-5 | 2.4 | −60 | 100 | 3500 | 0.2 |

*Molar ratio of initiator to catalyst.
**Polymer washed by precipitation three times.

Then an estimation of the surface of the resonance peak corresponding to this aromatic protons, relatively to the surface of the "aliphatic" portion of the spectrum allows the determination of the content of the aromatic nuclei of the polymer. The functionality in aromatic nuclei measured by NMR spectroscopy is in fair agreement with the one calculated for the azide functionality by infrared spectroscopy.

EXAMPLE 3

Functionalization Of PIB By Polymerization Initiated By $BF_3$ In The Presence Of 2-Azido-2-Phenyl Propane The same experimental procedure has been used as in the case of Example 2, except that the monomer is introduced in the reactor before the Lewis acid. The quantity of the latter, which is a gas, is measured volumetrically in a pressure bottle before admission in the reactor. The concentration of isobutylene is equal to 1.125 mole/liter, and the concentration of $BF_3$ is 0.05 mole/liter, except for the run 3-1 for which the catalyst concentration was 0.15 mole/liter. In all cases, the reaction duration was 30 minutes.

It is to be noticed that in many cases the functionality in aromatic nuclei is equal to the azide group functionality within experimental error.

TABLE III

ISOBUTYLENE POLYMERIZATIONS INITIATED BY BORON TRIFLUORIDE IN THE PRESENCE OF 2-AZIDO-2-PHENYL PROPANE (APP)

| Run No. | Mole Ratio Catalyst* | Temp. (°C.) | Wt. % yield | Polymer Product $\overline{M}_n$ | $f_{N_3}$ |
|---|---|---|---|---|---|
| 3-1 | 0.5 | −50 | 60 | 7000 | 0.8 |
| 3-2 | 1.0 | −50 | 100 | 3700 | 1.2 |
| 3-3 | 0.33 | −50 | 80 | 1700 | 0.8 |
| 3-4 | 1.0 | −50 | 100 | 8000 | 1.4 |

*Molar ratio of initiator to catalyst.

EXAMPLE 4

Functionalization Of PIB By Initiation Of Polymerization Initiated By $(C_2H_5)_2$ AlCl In The Presence Of 2-Azido-2-Phenyl Propane The same experimental procedure has been used as in the case of Example 2, except that the monomer is introduced in the reactor before the Lewis acid. The concentration of isobutylene is equal to 1.125 mole/liter, and the concentration of $(C_2H_5)_2AlCl$ is 0.05 mole/liter. In all cases, the reaction duration is 30 minutes. Results are shown in Table IV.

TABLE IV

FUNCTIONALIZATION OF PIB BY INITIATION OF POLYMERIZATION INTIATED BY $(C_2H_5)_2AlCl$ IN THE PRESENTCE OF 2-AZIDO-2-PHENYL PROPANE

| Run No. | Mole Ratio Catalyst* | Temp. (°C.) | Wt. % yield | Polymer Product $\overline{M}_n$ | $f_{N_3}$ |
|---|---|---|---|---|---|
| 4-1 | 1.0 | −50 | 100 | 3900 | 1.2 |
| 4-2 | 1.0 | −30 | 90 | 2700 | 0.8 |

*Molar ratio of initiator to catalyst.

EXAMPLE 5

Functionalization of PIB by Polymerization Initiated by Boron Trifluoride In the Presence of 2-Azido-2,4,4-Trimethyl Pentane (ATP)

The same experimental procedure has been used as in the case of Example 2, except that the monomer is introduced in the reactor before the Lewis Acid. The concentration of isobutylene is equal to 1.125 mole/liter, and the concentration of boron trifluoride is 0.045 mole/liter. In all cases, the reaction duration is 60 minutes. Results are shown in Table V.

TABLE V

| Run No. | Mole Ratio Catalyst* | Temp. (°C.) | Wt. % yield | Polymer Product $\overline{M}_n$ | $f_{N_3}$ |
|---|---|---|---|---|---|
| 5-1 | 1.0 | −70 | 100 | 2600 | 0.6 |
| 5-2** | 1.0 | −70 | 15 | 3000 | 0.6 |

*Molar ratio of intiator to catalyst.
**The solvent is pure hexane.

EXAMPLE 6

Functionalization of PIB by Polymerization Initiated by Titanium Tetrachloride in the Presence of Cyanhydric Acid The same experimental procedure has been used as in the case of Example 1, except that the concentration of cyanhydric acid in the reaction medium was $2.10^{-2}$ mole/liter. The polymerization yield was 100% and a functionalization degree of 0.5 was estimated from the infrared spectrum of the polymer, according to reported values of extinction coefficient of aliphatic nitrile groups.

EXAMPLE 7

Functionalization of a Random Isobutylene Styrene Copolymer by Polymerization Initiated by $Et_2AlCl$ in the Presence of 2-Azido-2-Phenyl Propane ("APP")

In a dry reaction vessel under vacuum, 200 ml of dichloromethane are introduced, followed by 1.44 g of 2-azido-2-phenyl propane (conc. 0.047 M) then 20 ml of isobutylene (conc. 1.125 M) and 10 ml of styrene (conc. 0.43). When the temperature of the mixture is −50° C., 8.5 ml of a solution one molar of diethylaluminum chloride is introduced. After polymerization is complete, as shown by calorimetric measurements, polymer recovery is done according to the same procedure as in Example 1.

The azide content is determined by infrared spectroscopy and the formation of a true statistical copolymer is demonstrated by GPC using UV and refractive index detections. The functionality of the copolymer, which contains $1.3 \cdot 10^{-4}$ mole/g of azide group, is estimated to be close to one, since the molecular weight determined by GPC using the polyisobutylene calibration curve is about 10,000.

In many cases the functionality in aromatic nuclei is equal to the azide group functionality within experimental error.

The terms and descriptions used herein are set forth by way of illustration only and are not meant as limitations on the many variations which those of skill in the art will recognize are possible in practicing the instant invention as defined by the following claims.

What is claimed is:

1. Novel terminally-substituted polymeric compositions comprising at least one member selected from the group consisting of:
   (a) R-(polymer*)-Y, and
   (b) Y-(polymer*)-Z-(polymer*)-Y wherein "polymer*" comprises a polymer derived from at least one cationically polymerizable monomer, R comprises hydrocarbyl, Y comprises a member selected from the group consisting of —$N_3$, —CN, —OCN, and —SCN, and Z comprises —R⁴— (i)

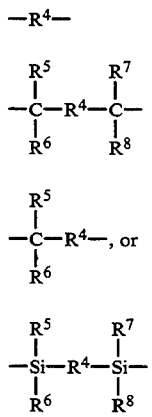

wherein R⁵, R⁶, R⁷ and R⁸ are the same or difference and are H or hydrocarbyl, and R⁴ comprises —C_aH_{2a}— and —Ar—, wherein "a" is an integer of from 3 to 20 and wherein said polymeric compositions have been prepared by a direct synthesis from said at least one cationically polymerizable monomer and a nitrogen-containing initiator having the formula R—(Y)_n or the formula Y-Z-Y, wherein R, Y and Z are as previously defined and n is an integer of from 1 to 10.

2. Compositions according to claim 1 wherein said polymer comprises polyisobutylene, polybutylene, polypropylene, polystyrene, or polymethylstyrene.

3. Compositions according to claim 2 wherein said Y group comprises azido.

4. Compositions according to claim 3 comprising a member having the formula R-(polymer*)-Y wherein R comprises hydrocarbyl, wherein polymer* comprises a polymer derived from at least one cationically polymerizable monomer, and wherein Y comprises —N₃.

5. Compositions according to claim 4 wherein R comprises a member selected from the group consisting of alkyl of from 3 to 100 carbon atoms, aryl of from 6 to 20 carbon atoms, alkaryl and aralkyl of from 7 to 100 carbon atoms and cycloalkyl of from 3 to 20 carbon atoms.

6. Compositions according to any one of claims 2 to 5 or 1, wherein said direct synthesis is performed in the presence of a cationic polymerization catalyst, and wherein the ratio of the molar equivalents of said nitrogen-containing initiator to the moles of said catalyst is from about 3:1 to about 1:3.

7. Novel terminally-substituted polymeric compositions comprising at least one member selected from the group consisting of:
(a) R-(polymer*)-Y,
(b) R*-(polymer*)-Y, and
(c) Y-(polymer*)-Z-(polymer*)-Y wherein "polymer*" comprises a polymer derived from at least one cationically polymerizable monomer selected from the group consisting of propylene, isobutylene, butene-1 and butene-2; wherein R comprises hydrocarbyl; wherein R* comprises hydrocarbylsily, Y comprises a member selected from the group consisting of —N₃, —CN, —NCO, —OCN, —SCN, and —NCS, and Z comprises —R⁴— (i)

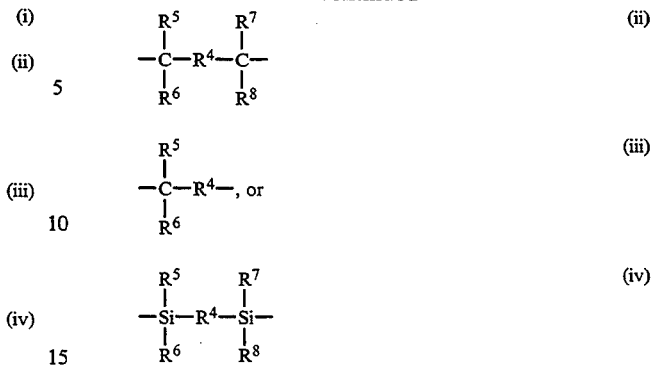

wherein R⁵, R⁶, R⁷ and R⁸ are the same or different and are H or hydrocarbyl, and R⁴ comprises —C_aH_{2a}— or —Ar—, wherein "a" is an integer of from 3 to 20 and "Ar" comprises arylene or alkyl substituted arylene.

8. Compositions according to claim 7 wherein said Y group comprises azido.

9. Compositions according to claim 7 wherein said polymeric compositions has the formula R-(polymer*)-N₃.

10. Compositions according to claim 9 wherein R comprises a member selected from the group consisting of alkyl of from 3 to 100 carbon atoms, aryl of from 6 to 20 carbon atoms, alkaryl of from 7 to 100 carbon atoms and cycloalkyl of from 3 to 20 carbon atoms.

11. Compositions according to claim 10 wherein said number average molecular weight is from about 700 to 5,000.

12. Novel terminally-substituted polymeric compositions comprising at least one member selected from the group consisting of:
(a) R-(polymer*)-Y,
(b) R*-(polymer*)-Y, and
(c) Y-(polymer*)-Z-(polymer*)-Y wherein "polymer*" comprises a polymer derived from at least one cationically polymerizable monomer selected from the group consisting of propylene, isobutylene, butene-1 and butene-2; wherein R comprises hydrocarbyl; wherein R* comprises hydrocarbylsily, Y comprises —N₃, and Z comprises

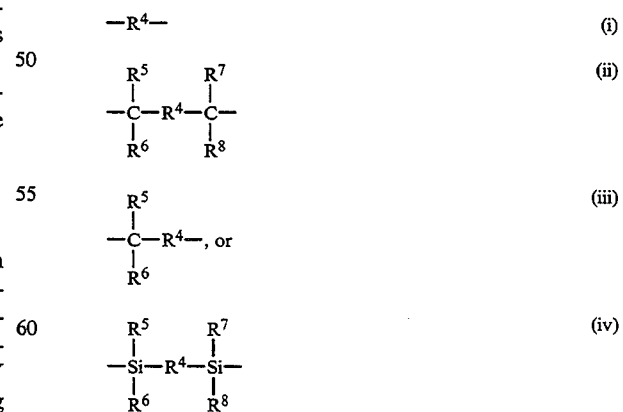

wherein R⁵, R⁶, R⁷ and R⁸ are the same or different and are H or hydrocarbyl, and R⁴ comprises —C_aH_{2a}— or —Ar—, wherein "a" is an integer of from 3 to 20 and "Ar" comprises arylene or alkyl substituted arylene.

13. Compositions according to claim 12 wherein said polymeric compositions has the formula R-(polymer*)-N$_3$.

14. Compositions according to claim 13 wherein R comprises a member selected from the group consisting of alkyl of from 3 to 100 carbon atoms, aryl of from 6 to 20 carbon atoms, alkaryl of from 7 to 100 carbon atoms and cycloalkyl of from 3 to 20 carbon atoms.

15. Compositions according to claim 14 wherein said number average molecular weight is from about 700 to 5,000.

16. Compositions according to any one of claims 2 to 5, 1 or 7 to 14, wherein said polymeric composition is characterized by a number average molecular weight of from about 300 to 50,000.

17. Compositions according to claim 16 wherein said number average molecular weight is from about 700 to 5,000.

* * * * *